United States Patent [19]
Lee

[11] Patent Number: 5,154,561
[45] Date of Patent: Oct. 13, 1992

[54] AUTOMATED ALL-WEATHER CARGO TRANSFER SYSTEM

[76] Inventor: Donald E. Lee, 2033 Parkview Ave., Abington, Pa. 19001

[21] Appl. No.: 508,234

[22] Filed: Apr. 11, 1990

[51] Int. Cl.⁵ .............................................. B65G 67/62
[52] U.S. Cl. .................. 414/138.3; 114/264; 405/219; 405/224; 414/138.1; 414/138.2; 414/139.6; 414/139.7; 414/139.8
[58] Field of Search ............... 114/264, 265, 266, 267; 405/202, 204, 219, 224, DIG. 8; 414/137.9, 138.2, 138.5, 138.7, 138.8, 139.4, 139.6, 139.7, 139.8, 141.7, 138.1, 138.3; 901/47

[56] References Cited

U.S. PATENT DOCUMENTS

| | | | |
|---|---|---|---|
| 4,074,818 | 2/1978 | Ray | 414/138.5 |
| 4,091,759 | 5/1978 | Liu | 114/264 X |
| 4,172,685 | 10/1979 | Nabeshima et al. | 414/140.3 X |
| 4,281,342 | 7/1981 | Ueda et al. | 901/47 X |
| 4,662,786 | 5/1987 | Cherbonnier | 114/264 X |
| 4,697,958 | 10/1987 | Kenny, Sr. | 405/224 X |
| 4,762,456 | 8/1988 | Nelson | 414/138.5 |
| 4,854,800 | 8/1989 | Frick et al. | 414/138.2 |

FOREIGN PATENT DOCUMENTS 613950  7/1978  U.S.S.R. ............................ 414/138.2

Primary Examiner—Robert J. Spar
Assistant Examiner—Janice Krizek
Attorney, Agent, or Firm—Paul Maleson

[57] ABSTRACT

An advanced automated vessel cargo transfer system for loading and unloading of ships and lighters. It includes an articulated manipulator arm mounted on a frame. The arm is provided with a spreader bar at the distal end thereof. The spreader bar is provided with facilities for grasping cargo. Sensors track the movement of the vessel, and automatically responsive controllers adjust the motion and position of the spreader bar to follow the motion of the vessel. Berthing modules are provided to aid in controlling the motion of the vessel. In a major embodiment, the manipulator arm is mounted on a transverse frame that bridges spaced-apart floating barges, and provisions are made for serving vessels both on the outboard and inboard sides of the barges. In another embodiment, the manipulator arm is shore-based.

12 Claims, 27 Drawing Sheets

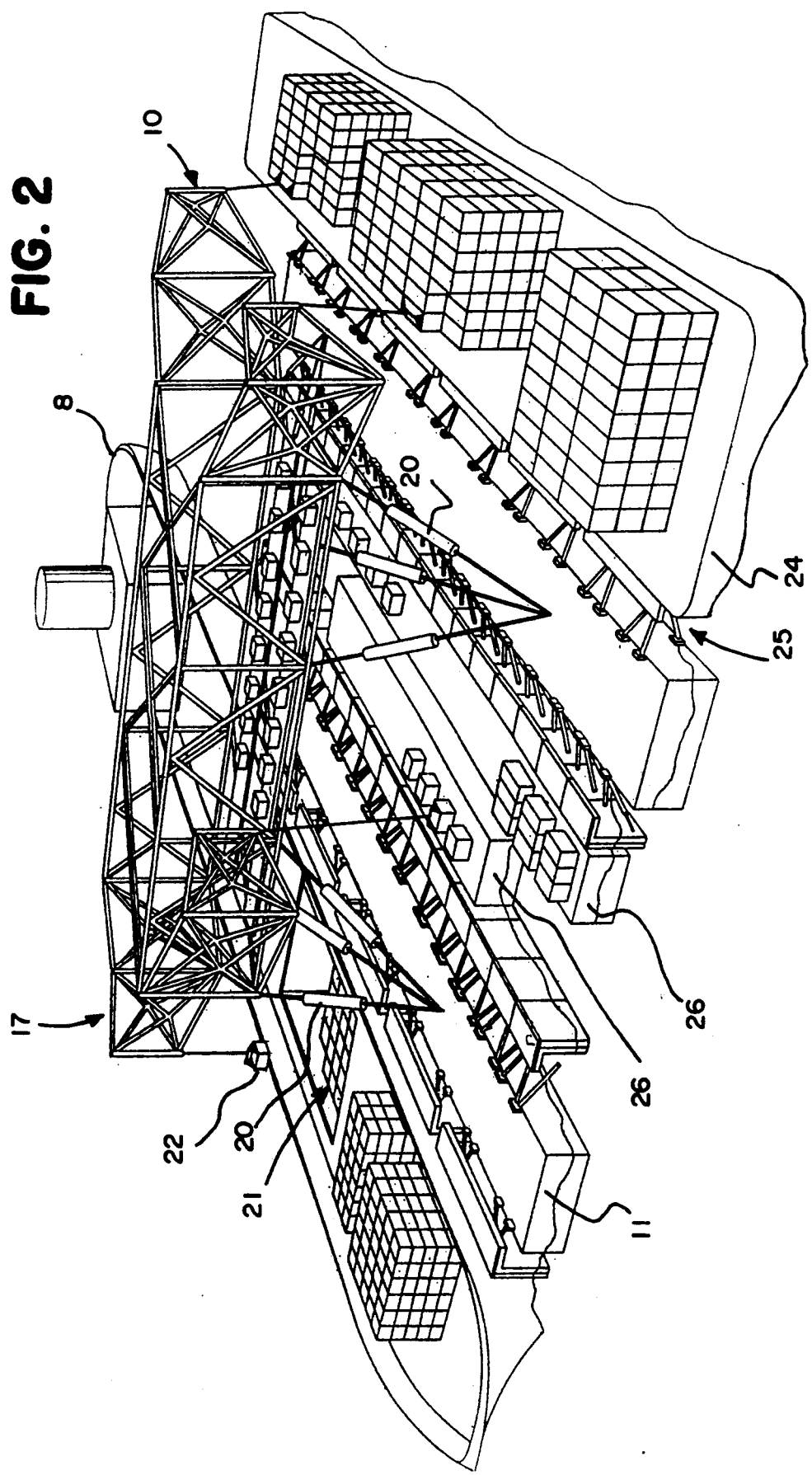

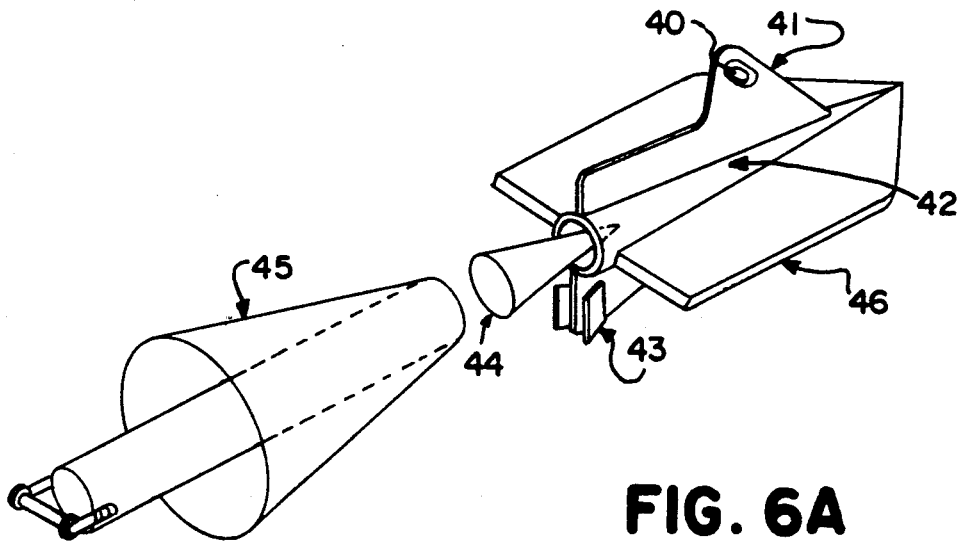
FIG. 6A
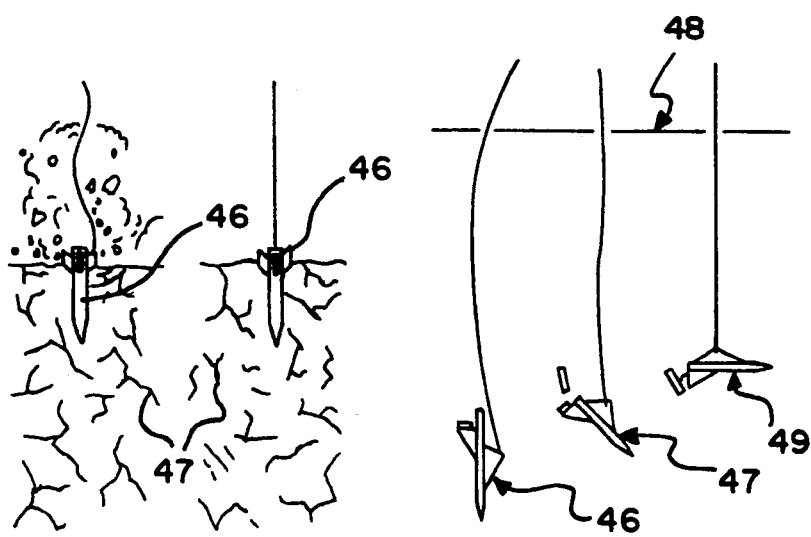
FIG. 6B  FIG. 6C

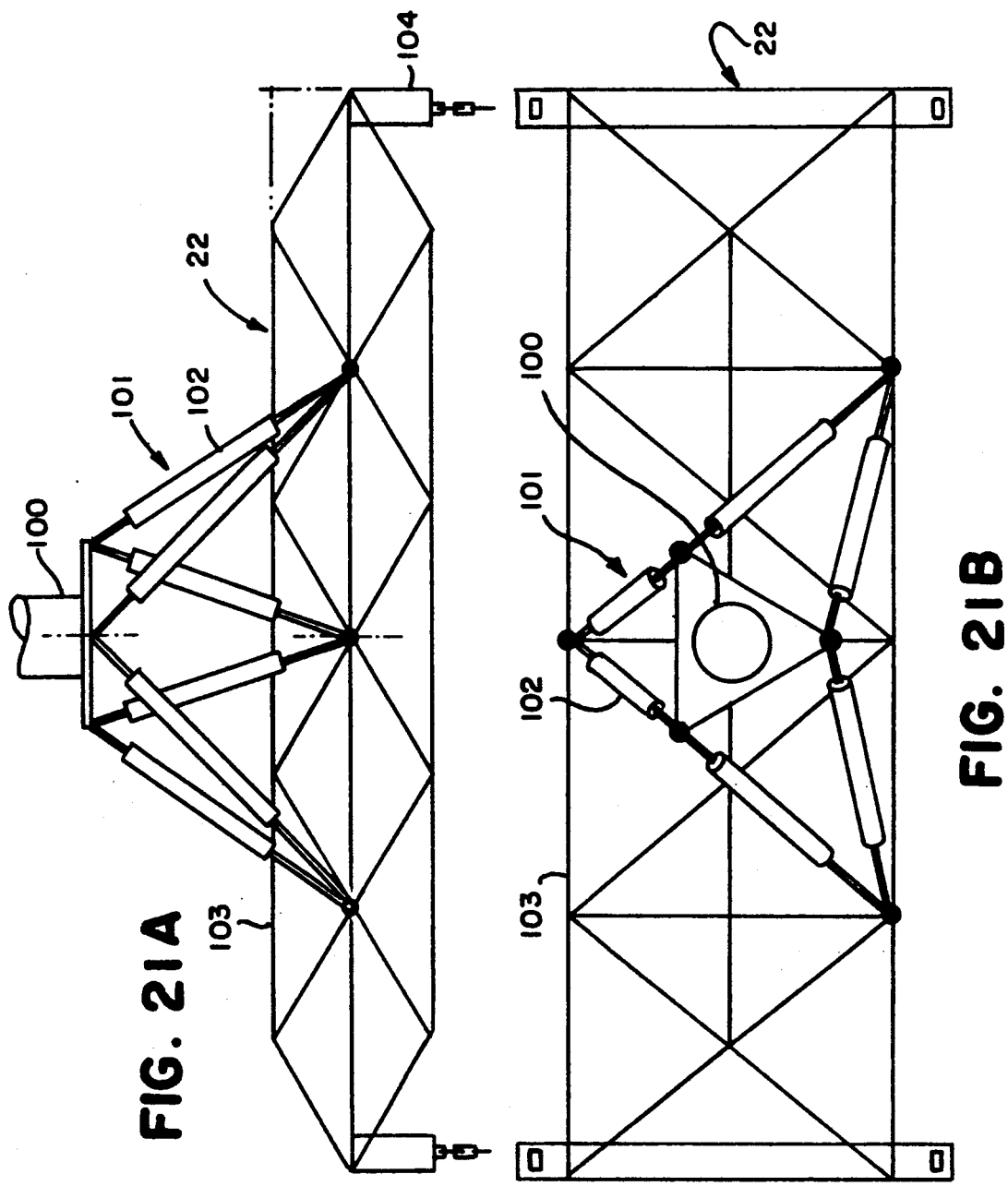

AUTOMATED ALL-WEATHER CARGO TRANSFER SYSTEM

BACKGROUND OF THE INVENTION

1. Field of the Invention

This invention relates to an advanced cargo handling system for offshore discharge of containerships. It relates to a facility involving berthing subsystems. Multiple ships and lighters may be serviced at the same facility at the same time. The invention has particular applicability and advantage in heavier seas than can ordinarily be accomodated, for example, in sea state 3 conditions or higher and in a logistics over the shore (LOTS) environment.

2. Prior Art

The offloading of containerized and breakbulk cargo from large oceangoing ships using existing equipment is hazardous if not nearly impossible during periods of rough weather and high seas. Conventional cargo handling systems are not designed to cope with the relative motion between ships and lighters under such conditions. The U.S. Army has a stated need to stabilize the offloading interface between ships and lighters under sea states equivalent to SS3 and higher.

The cargo handling technology for LOTS operation available now and projected through the early 1990s is based upon hardware that was essentially known or available in the 1960s. In fact, the methods used today are little different from those employed in World War II. This limits operations to relatively calm seas. The LOTS technology presently available will not meet demands for operations in adverse weather now or in the future. System upgrades are required.

Using conventional or slightly modified cargo handling booms or cranes, cargo transfer to landing craft in SS3 or higher conditions becomes extremely hazardous for personnel, cargo, and transfer equipment. While load pendulation and vertical descent rates can be nominally controlled, heavy seas create significant motion on the lighter in six degrees of freedom (DOF). In SS3 or higher, present methods and resources used for safe control of the lighterage-cargo interface exceed human capabilities.

Commercial shipping companies, recognizing the economic advantages of employing state-of-the-art technology, are currently developing system solutions that employ automated robotics techniques. Such innovations include the Sea Land grid rail system and Matson's Bridge Crane installation. These companies recognize that future shipping programs will dictate much greater automation, higher productivity, improved control, and better system reliability.

In contrast to the systems approach of the commercial shipping companies, the traditional military approach has been to design and add-on more hardware to adapt less-capable equipment, such as cranes, for operations in heavy seas. This approach has not provided a totally acceptable solution.

The relative motion problem between ships and lighters in a LOTS environment is a subset of the entire offshore cargo handling problem. The ship-lighterage interface requirement cannot be divorced from any of the other system requirements. Thus, solving the interface problems while still using obsolete and unsatisfactory crane technology would not have a major beneficial effect on the overall offshore cargo handling problem.

It has previously been considered that operations in SS3 and higher could not be accomplished, primarily because of the lighterage interfaces at the ship and beach. The following are some of the conclusions amplifying this problem as derived from the JLOTS II Throughput Test Report: During the test, 14.5 days (46 percent) of JLOTS II were lost due to conditions equal to or greater than SS3. Delays were experienced on the auxiliary crane ship (T-ACS) used for cargo transfer between the containership and lighters with as little as one degree of roll. Measures to control pendulation (but without vertical motion compensation) resulted in "an overly complex, massive crane hook assembly, rider block, and automatic spreaders (that) significantly increased the difficulty in controlling load pendulation." The four-month training program for Able Bodied Seamen (ABS) did not prove sufficient for the highly sophisticated T-ACS cranes. Experienced marine crane operators are recommended for manning the system.

The T-ACS represents a considerable step forward in terms of past capabilities to meet system deployment and cargo throughput requirements. However, the T-ACS still shares the common problem of all prior systems in that the lighterage interface remains highly subject to sea state motion. Developmental efforts have been made to mitigate problems with motion and load control which have greatly added to the complexity and cost of cranes. These efforts have shown some promise, in that cranes can be made to work in adverse conditions but at considerable cost to control systems, training, and personnel requirements. While improvements could be seen in some SS3 cargo tests, crane system add-ons have contributed nothing to improved routine operations, that is, operations when seas are calm.

The Chief of Naval Operations concluded: "The finding from this experience is that a sustainable Sea State 3 capability does not exist. The primary limiting element is the lighterage." "Neither the T-ACS, Navy lighterage, nor beach facilities demonstrated an adequate capability to operate in SS3 conditions." "The TCDF (Temporary Container Discharge Facility, i.e., a 250-ton lifting capacity truck-crane mounted on a B Delong barge moored alongside the containership) is very susceptible to wave and swell action. Pendulation problems restrict its usefulness to calm weather operations."

Aside from significant difficulties with pendulation and load control, existing systems have a number of related problems that also constitute part of the difficulty and contribute to the hazard of offshore cargo transfer.

Among these problems are response intervals between when a load should be moved and when the crane operator actually moves it in response to a condition observed. Rarely can a crane operator see the load when he both acquires, lifts and deposits it. Generally, the operator's responses at the controls will be a product of his judgment, training, and experience; however, his actions will also reflect someone else's experience and background, specifically his signalman or hatch captain who may be directing him. Tagline handlers will also influence the cycle by their actions. Thus, a number of independent variables become part of the equation for moving cargo or loading a lighter. Fundamentally, these include crew communication, crew experience, and timeliness in responding to the environment. There exists no single, instantaneous, direct feedback to the crane's control system reporting changes in load position or control of where it should go. Only in calm seas where there is inconsequential motion and more time to react does the existing load control system work satisfactorily.

All loads are suspended by cables at the end of long booms. This is the single, most important element in preventing cargo from being effectively manipulated and controlled in SS3 conditions.

Cables and winches provided the fastest, simplest, and best means to maneuver cargo. However, loads suspended by cables depend upon gravity for control and have little means to influence centrifugal or other forces introduced in a seaway, except by some tagline modification. As a result, the attachment of spreader bars to contains is slow and difficult, often constituting 50 percent or more of the cycle time per container, even in calm seas. Positioning of containers on the deck of the lighter is a hit-or-miss proposition. Tipping moments can be created by picking heavy loads at extended distances during roll periods, and manpower requirements for taglines are excessive in relation to any assistance rendered in facilitating transfer. Meaningful control is not attained.

Until now, solutions to the lighterage interface problem have focused on devices and new hardware attached to the hooks of various cranes. However, as noted by the JLOTS II Joint Test Director (above), the T-ACS crane (to use one example) has become massive, complex, and unwieldy while still not able to fully solve the interface problem.

Representative patents dealing in general with this area include U.S. Pat. Nos. 4,795,298; 4,395,178; 4,180,362; 4,393,906; 4,317,524; 4,172,685; and 4,158,416. Many other patents in the field also exist but are not believed to suggest the present inventive concept.

SUMMARY OF THE INVENTION

The Automated All-Weather Cargo Transfer System (AACTS), employs robotic materials handling techniques and a unique method to stabilize the ship/lighter interface. It is projected that the system will have a sea state 3 (SS3) capability of 600 containers per day. In calm seas, a rate of approximately 1,800 containers per day is estimated. The system will offload/load two ships and four lighters concurrently. It is estimated that the system will require only about 30 personnel for operation.

The design uses four B Delong barges as a platform for a large transverse frame. The frame encompasses a number of container manipulators with intelligent spreader bars, a conveyor system, and electro-hydraulic/pneumatic actuators (having six degrees of freedom capabilities). The system is operated by an automated control system.

Interface subsystems, known as berthing modules, will move in synchronism with a craft to impart forces which constrain or suppress the movement of a craft. A linear array of such modules provides a "soft" docking surface for vessels and can also be used to warp and rapidly cast off a vessel.

It is an object of the invention to provide a cargo transfer system.

It is an object of the invention to provide a system which avoids the use of cranes.

It is an object of the invention to provide a system which is large, but is not heavy or massive.

It is an object of the invention to provide a modular design to provide ease of transport and deployment.

It is an object of the invention to provide a system which has a buffering capability to absorb short term delays in lighterage arrivals without impacting the entire system.

It is an object of the invention to provide a system capable of being installed and operable within four days, given sea state 2 conditions of lower.

It is an object of the invention to provide a system capable of being moored in any fixed location in order to continuously maintain its relative attitude to the prevailing seaway and also capable of being located a distance of as much as 25 to 50 nautical miles offshore.

It is an object of the invention to provide a system readily adaptable for mooring an air cushion vehicle.

The primary natural environmental factors were determined to be wind, waves, ocean currents and bottom topography at the operational site. Beam currents on large ships are by far the largest sustained forces to be considered. Beam currents make it mandatory that the AACTS be oriented such that containership berths are maintained nominally parallel to the prevailing currents. Wind and wave conditions equivalent to SS2 are expected during installation. Table 1 summarizes sea state characteristics.

The AACTS system is intended to operate at a nominal throughput rate of approximately 300 containers per day during SS3 conditions and to withstand SS5 conditions without damage in a standby condition.

With adequate advanced warning and preparation, AACTS is intended to sustain only minimal damage in a "hurricane-alert" condition. Ocean bottom characteristics will have a significant impact on the moorings. Table 2 illustrates wind and current effects on ships moored in a seaway.

BRIEF DESCRIPTION OF THE DRAWINGS

FIG. 2 is a perspective view of the overall AACTS facility in use, showing ships and lighters in place;

FIG. 6A is a perspective view of a propellent embedded anchor launcher (PEA);

FIG. 6B is a simplified schematic view of a PEA entering a rock seabed;

FIG. 6C is a simplified schematic view of a PEA entering a sediment (mud or sand) seabed;

FIG. 21A is a side elevation view of a spreader bar with six degrees of freedom;

FIG. 21B is a plan view of a spreader bar with six degrees of freedom;

DESCRIPTION OF THE PREFERRED EMBODIMENTS

Because of tug limitations, the practical consideration of maneuvering cargo vessels into a berth or removing them from the berth dictates that maximum beam currents do not exceed 1.5 knots for most cargo vessels. An important factor is the existence of the varying forces with which the AACTS is struck during ship docking and cast-off with tugs.

TABLE 1

Summary of Sea State Characteristics
Sea State Conditions

| Sea State | 1 | 2 | 3 | 4 | 5 | 6 |
|---|---|---|---|---|---|---|
| Wind Velocity-knots | 7 | 10 | 16 | 18 | 23 | 30 |
| Wave Height-feet | 1 | 2–3 | 3–6 | 4–8 | 6–13 | 11.3–23 |
| Wave Period-seconds | 3 | 1–6 | 2–8.8 | 2.5–10 | 3.4–12.2 | 4.7–16.7 |
| Period of Maximum energy-seconds | | 4 | 6 | 7.2 | 8.9 | 11.3 |

TABLE 2

Ship Forces During Mooring Operations
Force (kips)

| | 30-Knot wind | | | | 4-Knot Current | | | |
| | Bow | | Beam | | Bow | | Beam | |
| Vessel | Light | Deep | Light | Deep | Light | Deep | Light | Deep |
|---|---|---|---|---|---|---|---|---|
| Barge Transports | | | | | | | | |
| LASH | 23 | 14 | 178 | 126 | 19 | 46.5 | 850 | 1572 |
| SEABEE | 21.2 | 13.3 | 162 | 118 | 17 | 40.9 | 755 | 1385 |
| NSS Containership | | | | | | | | |
| Portland | 9.3 | 7 | 74 | 56 | 14 | 24.9 | 565 | 801 |
| Oakland | 11 | 7.8 | 87 | 59 | 13.2 | 27.6 | 640 | 1112 |
| Jacksonville | 8.3 | 5.5 | 79 | 58 | 11.8 | 24.3 | 505 | 871 |
| Very Large Tanker Universe Ireland | 56 | 21.8 | 342 | 115 | 40.5 | 150 | 1450 | 4429 |

Figure 1:
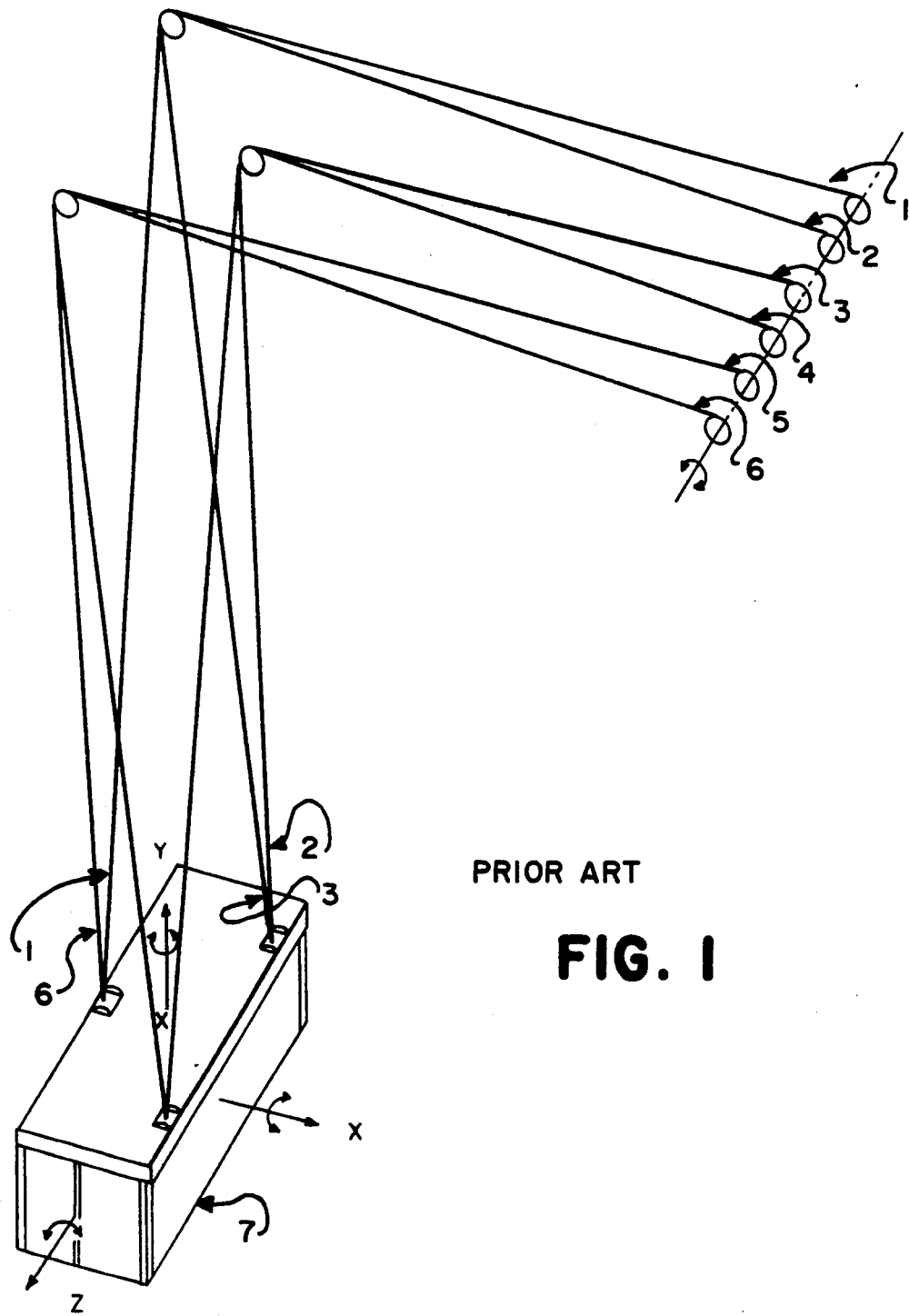
FIG. 1 is a schematic perspective view of a prior art six degree of freedom cable system.

The most promising prior art alternative to the AACTS which has any potential for providing true 6 Degree of Freedom (DOF) motion control for cranes in transferring containers is an all-tension variation of the 6 DOF motion simulator, as shown in FIG. 1. Six cables, identified respectively with reference numerals 1, 2, 3, 4, 5, and 6 are provided. Individually controlled winches, only schematically shown at the upper right of FIG. 1, selectively draw or release the cables. The cables are attached to a container 7 in pairs as shown. Selective rotation may be attained around the three axes X, Y, and Z.

Conceptually, a computer controlled six-cable variation could maintain container stability on T-ACS or TCDF cranes in spite of significant motion of the crane boom. This system was not selected for use in loading the lighters on AACTS because of the limited speed of response in horizontal translation where gravity and momentum play a significant role in operation of the system. This ends the description of the prior art expedient of FIG. 1.

The Automated All-weather Cargo Transfer System (AACTS) is a two-ship, off-shore, automated cargo transfer facility for the transfer of cargo in conditions through SS3. An AACTS facility is deployed to an operations area in a ship, such as a SEABEE. FIG. 2 is a general overall perspective view showing the AACTS in operation with multiple ships and lighters. The AACTS, generally designated 10, is assembled in the form of an "H", using four Delong B barges, 11, as "legs" of the "H" (two per side) and a large transverse frame, 16, as the cross-piece. The AACTS is moored in a controllable location at an appropriate offshore site (as required by the scenario) to mooring buoys that have been embedded in the seabottom. It is understood that the water bearing the vessel does not have to be a sea or ocean; it may for example be a lake or river. One containership, 8, may be moored alongside each of the outboard sides of the AACTS, while lighters, 12, pass through and are loaded inside the "H".

To better withstand sea-induced motion the AACTS has been designed to be large (i.e., spread out) but not massive (so as to limit its deployment). The preferred AACTS configuration consists of four Delong barges (two per side) connected by a transverse frame. The Delongs (each of which is 150-ft by 60-ft with a 10-ft height) are paired and placed end to end. The transverse frame is 300-ft by 100-ft. The Delongs and transverse frame are configured into an "H" shape. The AACTS requires an area of approximately 300×300 ft (90,000 sqft), plus mooring requirements.

The AACTS is deployable on a variety of ships. For the purposes of discussion, a SEABEE ship is assumed. The transverse frame with its container handling manipulators is modularly disassembled and left mounted on the Delongs. Only one Delong requires further disassembly in order to use the full length of the SEABEE's weather deck by understowing the superstructure. The Delong's own pneumatic equipment is used to support assembly of the components on the one understowed barge. The AACTS is capable of being assembled and moored by personnel from an Army Port Construction company using two 60-ft tugs.

The AACTS must be readily deployable and, upon arrival in the objective area, quickly assembled and made operational. The AACTS is partially disassembled into four modules for deployment on a SEABEE, a ship which is capable of transporting B Delong barges. The AACTS, with two 65 ft tugs, should be deployed as a package. The Delongs and the tugs are weather deck requirements but would all fit, even if stowage space is limited. Three of the modules wold each have one-fourth of the transverse frame (50 by 150 ft) in a lowered position on the barge deck. These sections potentially could be joined on-site and raised to normal operating level. The fourth module would require more detailed disassembly for stowage below the superstructure on the SEABEE ship. The upper portion of the transverse frame for that fourth module could be re-assembled on the SEABEE ship after the other three modules have been off-loaded.

The AACTS module which is stowed below the superstructure would require its three shipside and nine lighterage stabilization and control modules to be removed and stowed elsewhere. This may be necessary to permit the transverse frame quadrant to rest directly on the deck of the Delong. This provides an additional six ft of height for the disassembled frame. All items over eleven ft above the deck of the Delong will be removed and the upper main structural beams will be lowered to stowed positions above the base members. Special fixtures will be provided to expedite assembly and disassembly operations. After the transverse frame quadrant is assembled, it is temporarily lifted sufficient to permit the shipside and lighterside stabilization and control modules to be mounted in their stowed position on the deck. The transverse frame quadrant is then lowered to its stowed position above the other modules.

For assembly of all quadrants, all four barges would be moored in a single 120 by 300 ft rectangle. First 100 by 150 ft half sections of the frame would be assembled. Once the half sections are assembled, they would then be end-connected to form the full 100 by 300 ft transverse frame. Two key operations are critical to deployment into the final "H" configuration. The frame must first be elevated to a prescribed minimum height and, secondly, the barges must be rotated, and end-connected. These key operations are dependent upon a trolley system on each barge (which also acts as a load-spreader during throughput operations) and power systems on each barge to provide the means to elevate individual quadrants of the transverse frame.

Figure 3A:
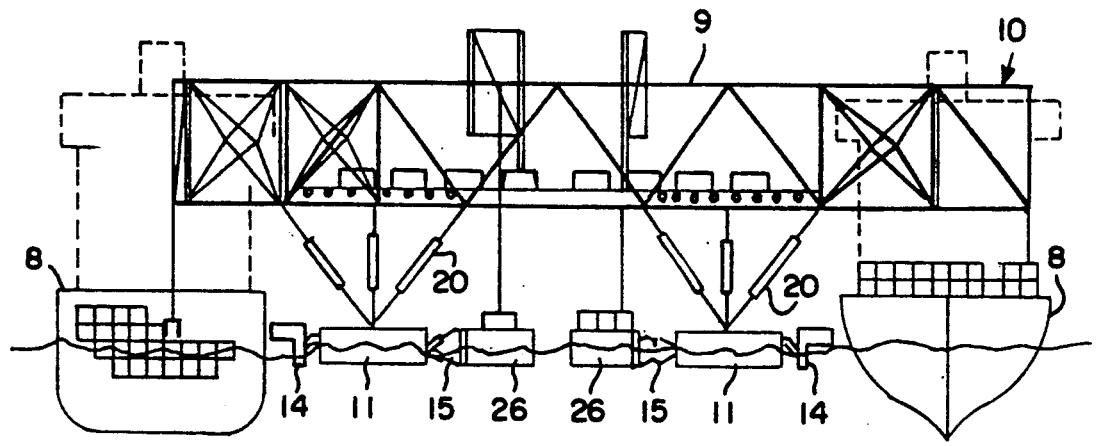
FIG. 3A is a front elevation view, partly in broken section, of the AACTS.
Figure 3B:
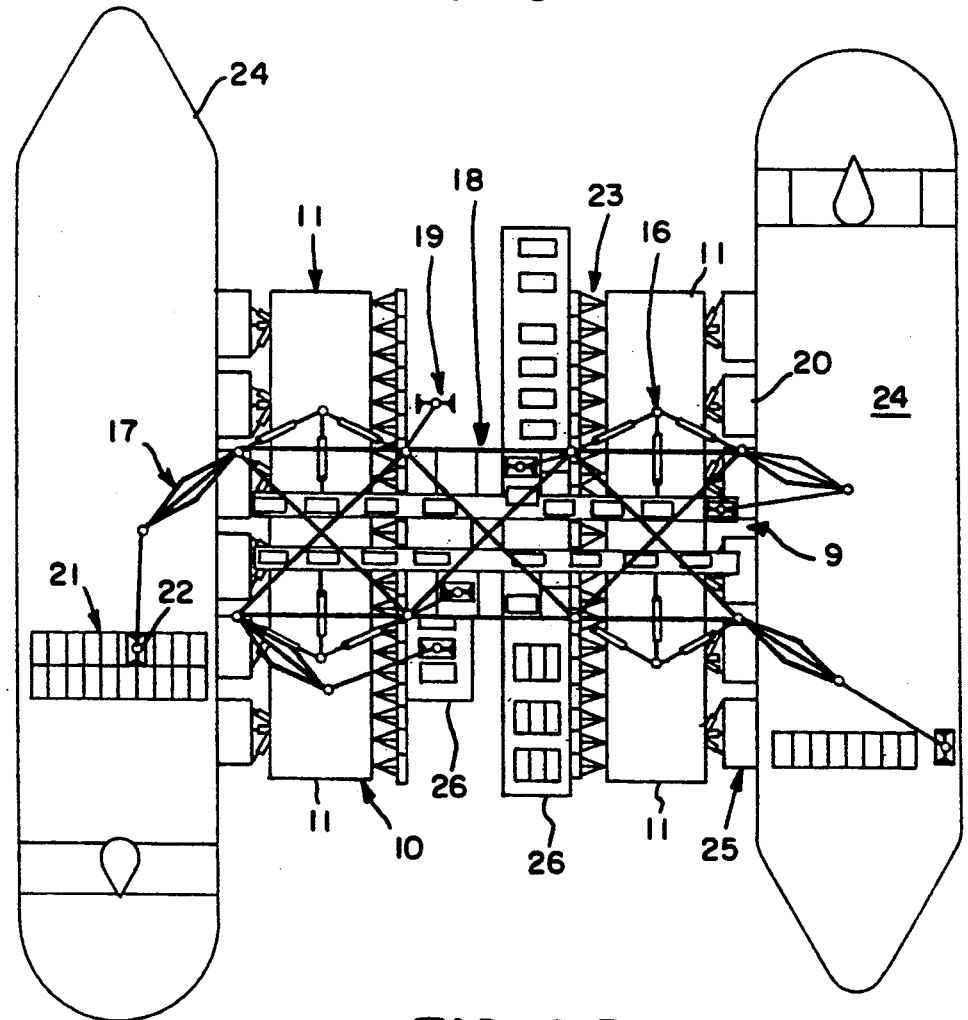
FIG. 3B is a plan view of the AACTS.

An AACTS will include the following major elements or subsystems and/or components. These are best initially described in connection with FIGS. 3A and 3B. There is a mooring and anchoring subsystem to hold the system in its location. This is not shown in these figures but is described more fully hereafter. Four Delong B barges, each designated 11, support the overall facility or system, generally designated 10. Twelve electrohydraulic actuators (three per corner) 20 provide a relatively motionless support for the transverse frame 16. A modular transverse frame 16 is provided for elevation of the cargo handling and lateral transfer equipment. It may be made of aluminum beams or other suitable structural materials. Four ship cargo manipulators or manipulator arms 17, (two per ship located at each end of the transverse frame) are provided for transferring containers on/off the ship. A conveyor subsystem 18, (located on the transverse frame) is provided to laterally move cargo from the shipside to landing craft (lighterage) loading points. The system may be provided in a simplified embodiment in which the cargo is transferred directly from shipside to shore transport without the intervention of a conveyor. A lighterage cargo manipulator subsystem 19 (four manipulators per AACTS) is provided to load and unload craft. Intelligent spreader bars 22 are mounted on each manipulator arm to permit flexible and automated access to cargo 21. Several ship berthing modules 25 are provided to exert some motion control over the ship 24. Several craft (lighter) berthing modules 23 are provided to exert some motion control over the lighters 26. An automated AACTS control subsystem (with back-ups), not shown in these figures, is provided.

In operation, it is projected that one AACTS will be operable around-the-clock by one Transportation Terminal Service (Container) Company. Two containerships will be moored on the outboard sides of the "H", while four lighters can be served inside the "H" (two port, two starboard).

AACTS will be moored offshore using an automated anchor installation system and an automated winch system such as those proposed for the Navy.

Linear arrays of shipside berthing modules will provide an interface between the containership and the AACTS. These modules will have the ability to move independently in multiple degrees of freedom in response to commands provided by the AACTS automated control system. They will include an interface interlock system that will attach the berthing module to the ship. The shipside berthing modules will be used to suppress the relative movement between the ship and the AACTS, provide a "soft" docking surface for the ship, warp ships along the AACTS in conjunction with the automated winch system, rapidly cast-off vessels, and provide positional feedback to the automated control system.

Movement of containerized cargo at the ship will be accomplished by a pair of container handling manipulators at each end of the transverse frame, two manipulator arms per ship. The arms will have a reaching radius of 140 ft over the deck of the containership. Manipulators, each with a rigid vertical hoist and an intelligent spreader bar, will automatically acquire containers and lift them from the ship's main deck or from its cells. The manipulators will then place the containers onto a conveyor inside the transverse frame.

The conveyors will transport the containers to locations inside the "H" above a lighterage loading point.

As lighters approach the AACTS, they will be guided toward the lighterage berthing modules by a green-yellow-red light system near that location. Nine lighterage berthing modules will be used per Delong barge, for a total of 36. The modules will be located on the Delongs on the inside of the "H" configuration.

As with the shipside berthing modules, linear arrays of lighterage berthing modules will provide an interface between the lighter and the AACTS. The lighterage berthing modules will be used to suppress the relative movement between the lighter and the AACTS, provide a "soft" docking surface for the lighter, warp the lighters along the AACTS, rapidly cast-off vessels, and provide positional feedback to the automated control system.

Once a lighter is in position and a container is available on the conveyor, a lighterage manipulator arm, with a rigid hoist and an intelligent spreader bar, will pick up the container from the conveyor and place it on the waiting lighter. AACTS has four lighterage manipulator arms to service four lighters simultaneously.

Loading inside the "H" configuration affords lighters increased shelter by using the lee of the ship. The use of manipulators eliminates problems with pendulation and the need for on-deck tagline handlers. It also permits more precise spotting of containers. All loading operations will be computer controlled with craft motions sensed and feedback provided to the computer to ensure soft landing of cargo on the lighter despite sea conditions. As a safety feature, manual overrides will be available to operators located on the transverse frame above each craft loading point.

The ability of the AACTS to automatically pick and place containers in high sea states is largely due to the fact that the AACTS transverse frame is held fixed in space by the frame stabilization system. The major portion of the frame stabilization system consists of four sets of actuators. Each set forms an inverted tripod to connect the Delongs to the transverse frame. Each set is located in the center of a Delong to support one corner of the transverse frame. By controlling the actuators based on readings from a gyroscope and accelerometers, the frame stabilization system will essentially fix the transverse frame in space. It is estimated that frame motion at the extremes will be limited to plus or minus 6 inches. The stabilized transverse frame provides an ideal platform for the manipulator arms and the conveyor system.

Based upon the Joint Logistics Over The Shore (JLOTS) II Test and Evaluation Program, one T-ACS has an average daily productivity of about 200-225 containers per ship (six cranes). Under ideal conditions it was felt that productivity could reach 300 containers per day. No SS3 productivity was officially recognized in JLOTS II reports, although some experimentation was separately done.

By contrast, in a 20-hr day, it is estimated that one AACTS may discharge 600 containers in SS3. This is based upon an average handling rate at each lighterage manipulator of 4 mins. per container and about 5 mins. per craft succession. This preliminary estimate does not consider a number of outside variables such as lighterage type, craft availability, and the time to moor and clear these craft, etc. While the estimate allows for routine delays, it assumes continuous availability of lighters and ships.

The SS1 container handling rate for AACTS is expected to be about 1.5 mins. or less from ship to conveyor, and about 2 minutes or less from conveyor to lighter. This translates into a rate of about 1,800 containers per day. This, again, assumes unlimited lighters, and only routine delays. In actual practice, additional delays will no doubt occur, such as non-availability of lighters, ship successions at the AACTS, operational changes, breakdowns, etc. However, AACTS has the potential for providing large gains in productivity over current systems.

The AACTS eliminates the need for personnel to work in hazardous tasks associated with off-loading function, and provides an alternate method of transferring containers at sea without the use of crane technology. A basic requirement is that the system have a stable platform and a large foundation or support "footprint". This is a practical method to reduce pitch and roll. Four B Delong barges in a two by two catamaran configuration provides a 150 by 200 ft base for a stable transverse platform, a solid foundation for the interface stabilizers (berthing modules) and a logical mounting location for the AACTS mooring system. Placement of the transverse frame or platform supports at the center of the Delong barges will minimize the roll, pitch and yaw movements, and maximize stability during heavy lifts with long reaches. The large foundation which provides improved stability also permits the AACTS to off-load two NSS containerships simultaneously. The space between the two ships will provide a degree of protection for lighterage. A good mooring system for ships and the AACTS is essential. Platform support flexibility is necessary to prevent barge motion from creating excessive loads on the platform structure. A gas spring system can provide the required flexibility under all conditions including emergency power outages. Highly intelligent robotic manipulators presently in use in American factories can be scaled up to meet the automatic cargo transfer requirements. Six DOF motion simulator systems can be directly adapted to position mobile lighterage berthing modules which can reduce the surge, sway, roll and yaw motions of lighters. The propellant embedded anchors (PEA), mooring modules, dolphins, container movers and other components of the NAVFAC Advanced Cargo Transfer Facility (ACTF) may be directly applicable. The present conceptual design is deployed on a SEABEE ship, although other applications are apparent.

Alternative applications for the cargo transfer facility are pierside transfer from ships to trucks, surf-side transfer from lighters to trucks, or off shore transfer from ships to trucks on a causeway. All components of the AACTS exist in some form in the current technology.

Figure 4:
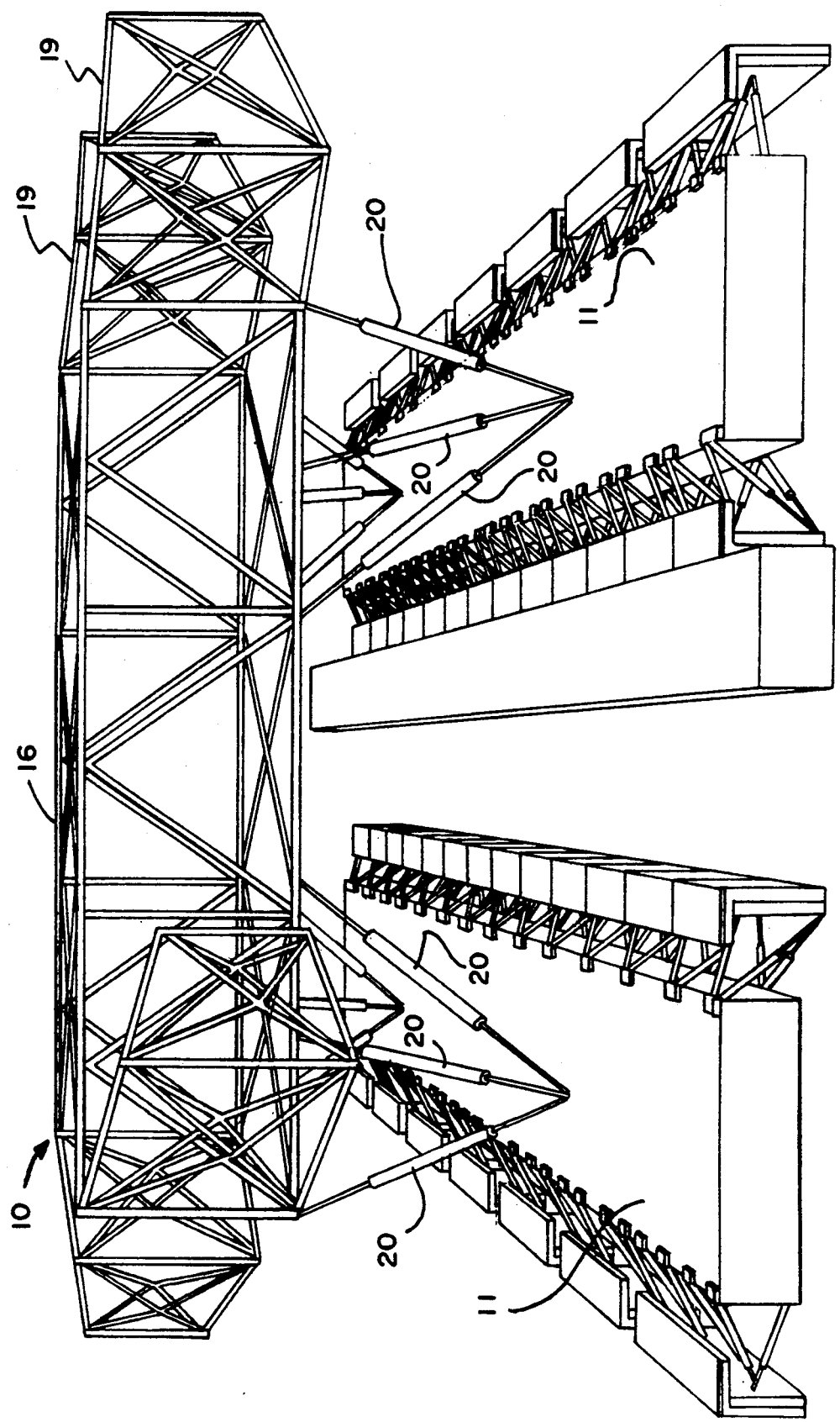
FIG. 4 is a perspective view taken from the front showing the AACTS.
Figure 5A:
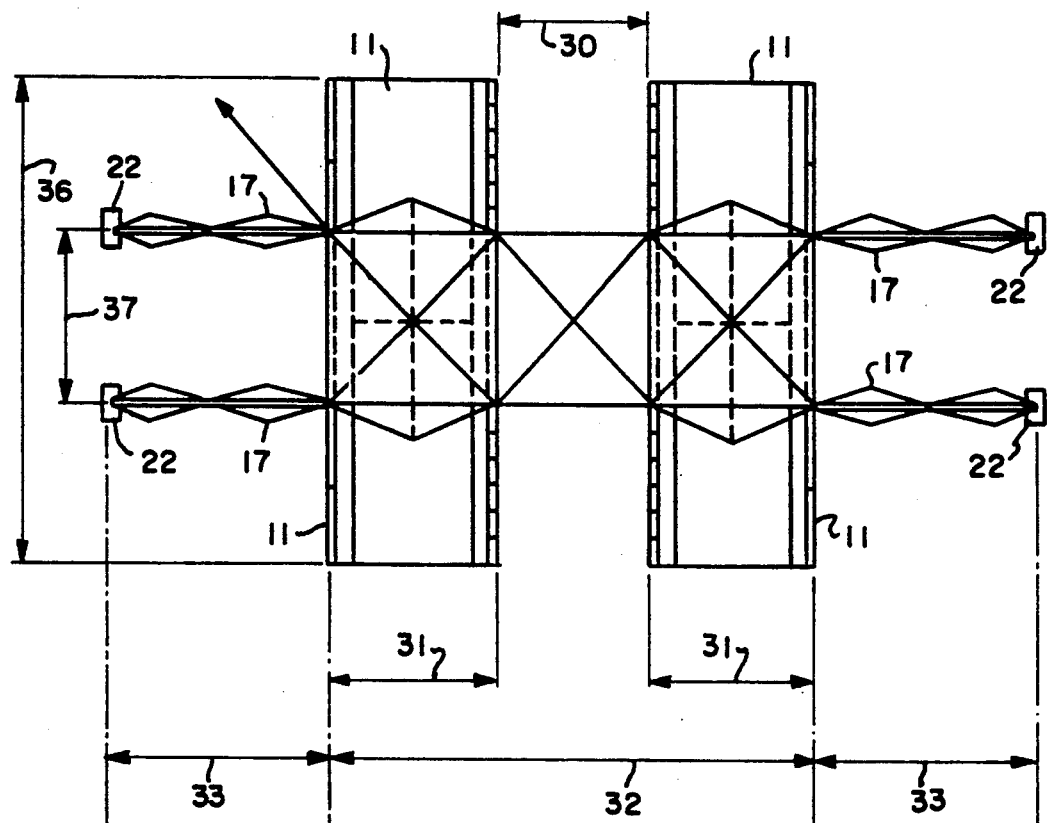
FIG. 5A is a simplified plan view of the AACTS.

The AACTS concept is a robotic system consisting of intelligent spreader bars, manipulators, conveyors, sensors, and actuators mounted on a large elevated frame attached to Delong barges. A partial perspective view of the system is shown in FIG. 4. Typical basic dimensions of some elements are given in connection with FIGS. 5A and 5B. The space between parallel barges 11 may be 90 to 150 feet, designated 30. The width of a barge 11 may be 90 to 150 feet, designated 31 and the length may be 300 feet, designated 36. The distance between adjacent spreader arms 22 may be 100 feet, designated 37. The length of an extended manipulator arm 17 may be 140 feet, designated 33. The length of the transverse frame 9 from arm pivot to arm pivot may be 300 feet, designated 32. The height of the transverse frame 9 may be 75 feet, designated 34 and the bottom of said frame may be 75 feet above water level, and designated 35.

The AACTS is an offshore cargo handling system that employs a floating platform, in the form of a catamaran, as a foundation. With suitable ballast, the four Delong barges should provide an adequately stable base for the AACTS in sea states through SS6. For these reasons, one major platform alternative stands out as being readily deployable and preferable, the B Delong barge. It was proven deployable on SEABEEs and would be deployable on semisubmersible hulls (developed in Western Europe primarily for the offshore oil fields). The B Delong has been available within the Army's inventory for many years and has a proven track record in the LOTS environment.

In terms of ocean currents and other sea induced motion, it was postulated that a fixed position was desired. The most promising means to hold the AACTS (and two ships) is believed to be a Navy-developed propellant embedded anchor (PEA) system. A PEA is shown in FIG. 6A. The PEA, generally designated 46, includes a sediment projectile 41, a hollow tapered tube 42 to accept a rock projectile, keying flaps 43, a rock projectile forming a core 44 of sediment projectile and a launcher 45. FIG. 6B shows the PEA entering a rock seabed 47. FIG. 6C shows the PEA entering a sediment seabed, as mud or sand 48. The PEA is shown in penetration, 46, in rotation 47, and in anchor established mode 49. These are technology elements of the Navy Advanced Cargo Transfer Facility (ACTF) which are expected to provide a single anchoring technique for sediment or rock sea floors, and automated anchor installation/retrieval.

In addition to automating anchor installation/retrieval, the mooring module assists in positioning ships within the mooring. The mooring module eliminates manual handling of the massive anchors and chain needed to anchor large ships offshore. Large winches aboard the module eliminate the need for tugs to berth the ships.

Each of the two-barge supports for the AACTS should be adjustable to a constant tension mooring system with winches on the barge centerlines at either end and at the connection between the two barges. Additionally, mooring cables are connected from either end of the two-barge supports to pile anchors placed about 500 ft out on either end of the barge support system.

The combination of a stiff mooring system for the AACTS and a strong, energy absorbing interface stabilization device between the AACTS barges and the containerships provides a stable, controllable system for offloading containers in SS3 or higher sea states. Relative motions are very much affected by the stiffness and prestress of the spring and breast lines and the resiliency characteristics of the shipside interface stabilization devices.

Figure 9A:
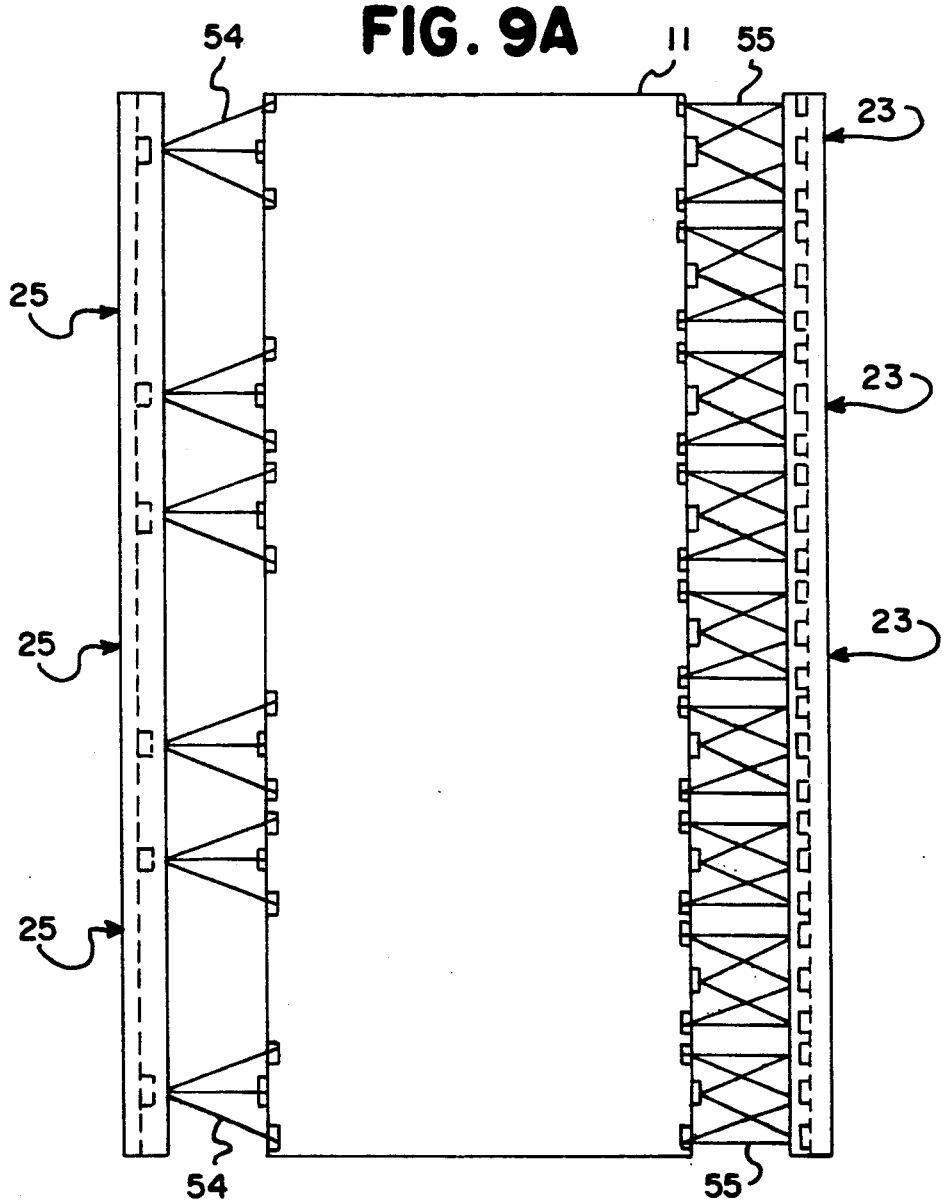
FIG. 9A is a plan schematic view of berthing modules on a Delong Barge.
Figure 9B:
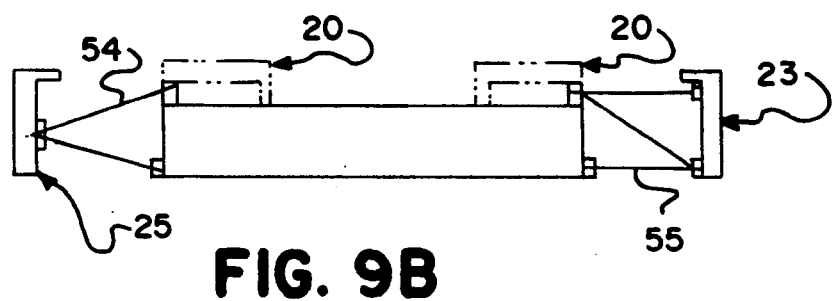
FIG. 9B is a side elevation view of berthing modules on a Delong Barge.

A linear array of automated berthing modules 23 (lighter modules) and 25 (ship modules) are attached to the sides of the Delong barges. With multiple degrees-of-freedom (DOF) motion capability, each berthing module can move in synchronism with the lighter or ship to impart controlled forces which constrain or suppress the movement of the craft in the seaway. FIGS. 9A and 9B show berthing modules which are best explained in connection with these figures. In addition, the modules provide a "soft" docking surface for the craft, can be used to warp the craft along the Delong barges and can be used to rapidly cast off a craft. The modules can be packaged on the barge deck for deployment at the operational site, or they can be attached to the barge as it leaves the SEABEE ship, as shown in FIGS. 9A and 9B.

Figure 7:
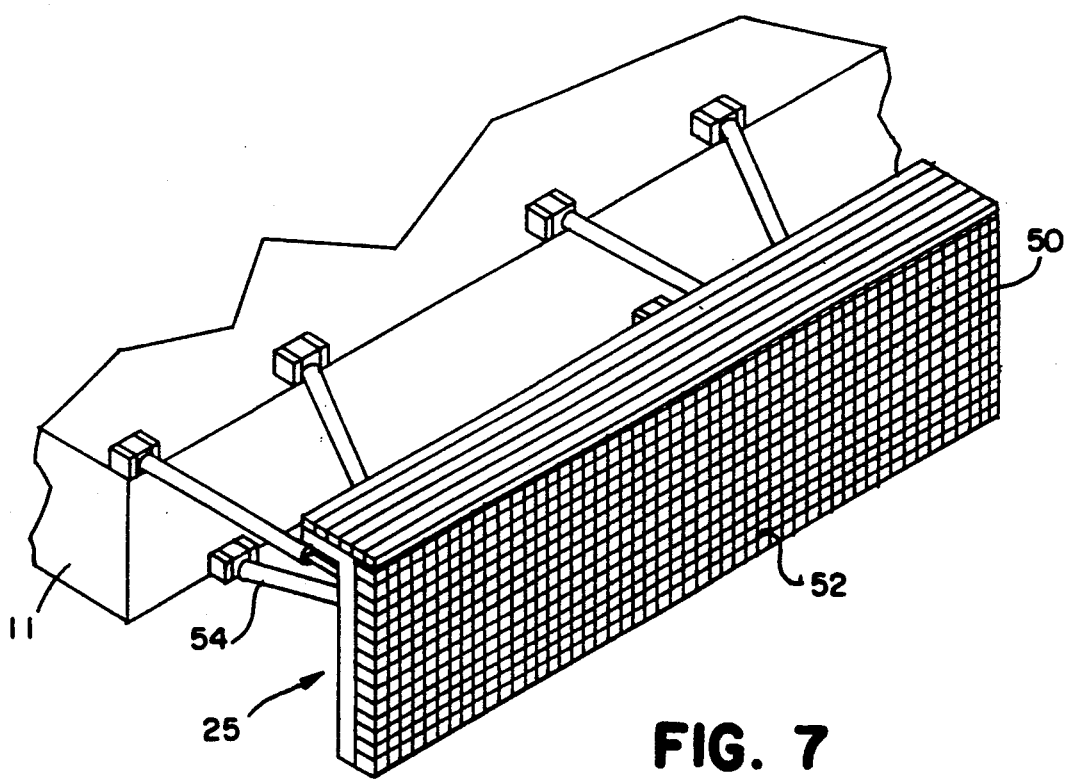
FIG. 7 is a perspective view of a ship berthing module having five controllable degrees of freedom and freedom to roll.
Figure 8:
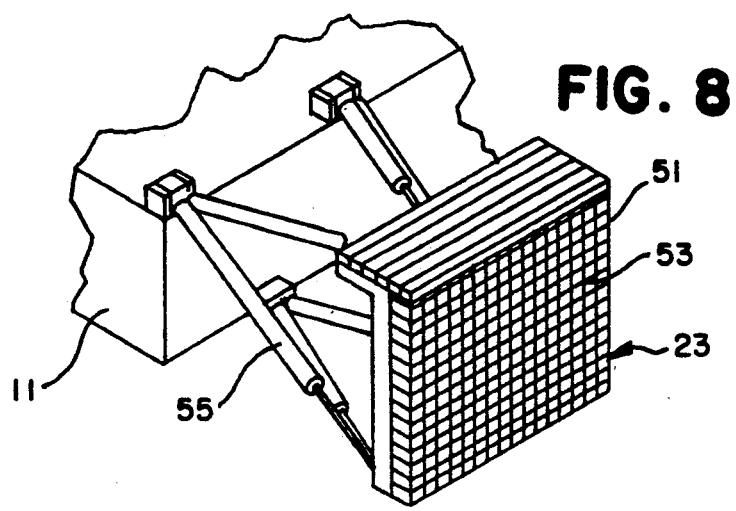
FIG. 8 is a perspective view of a lighter berthing module having six controllable degrees of freedom.

FIG. 7 shows a ship berthing module generally designated 25, and attached to a barge 11. FIG. 8 shows a lighter berthing module attached to a barge 11.

The primary purpose for the berthing modules is to reduce the relative motion between the lighter (or containership) and the AACTS. By reducing the relative motion, safety to personnel and equipment is improved and the cargo handling system can function more efficiently. The system is expected to enable a lighter to be docked under sea state conditions of SS3 or higher.

In addition, the berthing modules provide position feedback signals to the automated cargo transfer system to let the system know the position of the craft and what types of motions are influencing the craft. It is critical for the automatic controls to have the recent motion history and the instantaneous position and rate of craft movement. This real-time position and rate information enables the cargo handling control system to gently pick and place containers from/to a craft.

Figure 10:
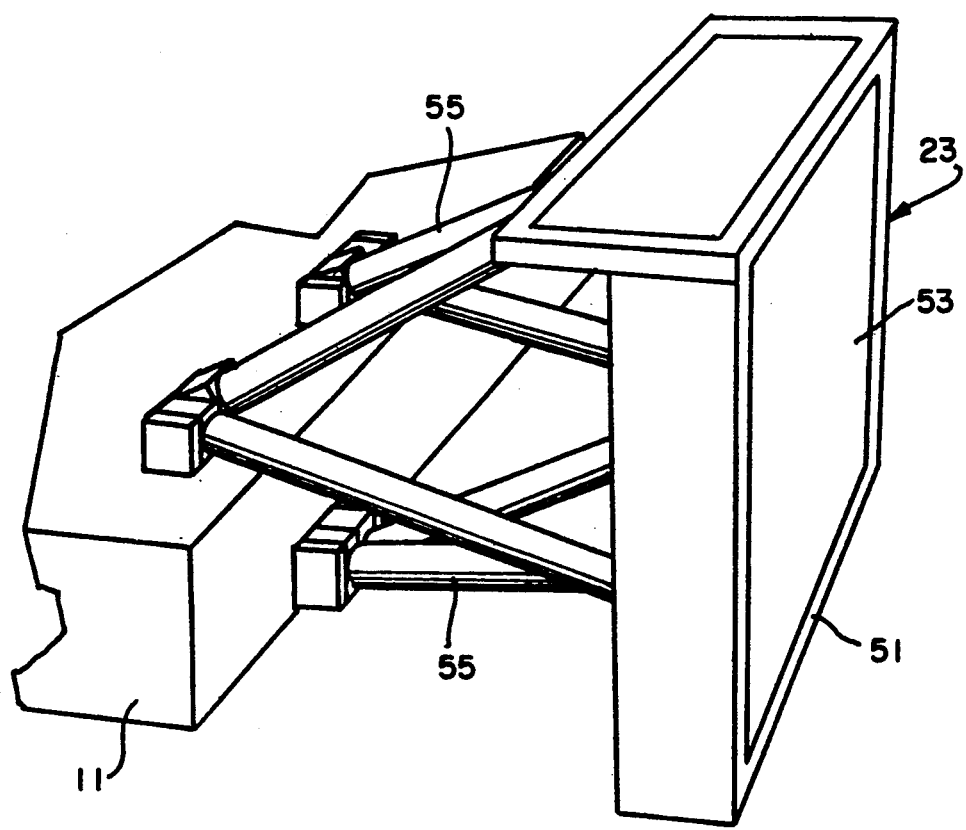
FIG. 10 is a perspective view of a berthing module.

With control circuitry similar to those of motion simulators, the modules are able to track the motions of a craft in the seaway as it approaches the berth. Moving in synchronism with the craft until it is secured, the berthing modules provide restraints against rolling, yawing, surging and swaying by gently but firmly opposing the ocean forces. Pitching and heaving motions, however, will not be significantly attenuated by the berthing modules, but constrain of these motions is not required because of the flexibility of the manipulator arms. FIG. 10 shows a perspective view of a 6 DOF lighterage berthing module.

The energy absorbing capability of each module is much larger than that of pneumatic fenders, single vee or double vee type fenders currently recommended for fixed or floating pier offshore cargo offloading facilities.

A typical lighterage berthing module 23 is about 16 ft long and 15 ft high. Nine modules are mounted on the lighterage berthing inboard side of each Delong barge 11. On the outboard or ship side, three 50 ft long containership berthing modules 25 are mounted on the outboard sides of each Delong barge 11.

Two types of berthing modules are used in AACTS, one type is used with ships and the other with lighters. Both types are similar in function and design.

Figure 11:
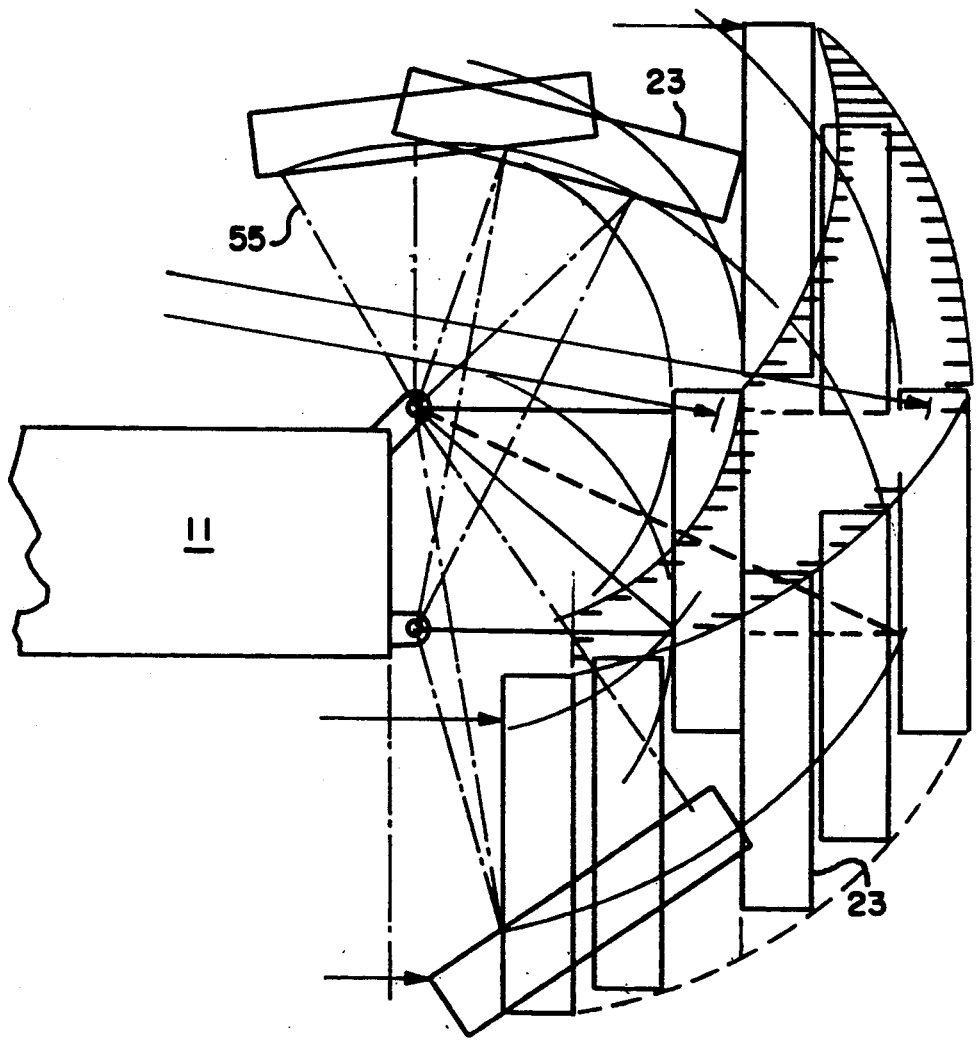
FIG. 11 is a schematic showing of the motion capability of berthing modules.

The lighterage berthing modules will be supported by a system of six hydraulic actuators which connect to three points on the side of the Delong barges and three points on the berthing modules. In the minimum extension configuration, all six actuators are at the retracted position and the movable berthing modules are parallel to, and about 15 ft from the side of the barge. In the maximum height configuration, all six actuators are fully extended and the berthing modules are parallel to, and about 25 ft from, the side of the barge. Between the fully extended and fully retracted positions, the movable berthing surface could be adjusted to a variety of positions with full flexibility in 6 DOF. Specifically, the berthing module can move with the berthed craft in pitch, roll, yaw, heave, surge and sway. FIG. 11 illustrates the range of a berthing module's motion. A module 23 is shown at various positions relative to the barge 11. The hydraulic actuators 55 are shown schematically.

To the extent that the lighter can be firmly or securely attached to the berthing module surface, a restraining force could be exerted on the vessel to reduce the effects of the environment (i.e., wind, waves and currents) and the momentum of the craft. With the amount of available movement of the berthing module and the ability to exert a pre-established level of force from the moment of contact, the system should be able to safely berth a lighter with closing rates significantly higher than possible with even the best types of fenders.

The containership berthing modules 23 or 25 are supported at each end by a system of three hydraulic actuators 55 or 54 which connects to three points on the side of the Delong barges 11 and at a single point on the berthing modules. The points of attachment on the movable module are near the center of buoyancy, above the center of mass and roughly at the center of force or reaction to a ship acting on the module. In the minimum extension configuration, all three actuators at either end are in the retracted position and the berthing modules are parallel to, and about 15 ft from the side of the barge. In the maximum extension configuration, all three actuators at either end are fully extended and the movable berthing modules are parallel to, and about 25 ft from the side of the barge. Between the fully extended and fully retracted positions, the movable berthing surface can be positioned in a variety of positions with flexibility in five degrees of freedom. Specifically, the berthing module can move with the berthed containership in pitch, yaw, heave, surge and sway. With a pivoted mounting to the actuators, the berthing modules are free to conform to the roll of the ship as reflected in the attitude of the hull at the waterline.

Feedback elements on the actuators provide position and rate information about the ship or lighter to the automated control system. Such sensing and feedback elements are in themselves known in the art.

The berthing surface 52 or 53, as shown respectively in FIGS. 7 and 8 permits ships and lighters to tie up without special fendering. In addition, the berthing modules should be able to automatically grasp the craft in some manner to allow the berthing module to impart controlling or constraining forces on the craft.

Conventional wooden docking materials could be used for a basic berthing module surface 52 or 53, but these are not considered to be the best. A tough, resilient, rubber-like material may be better in that it could exert a stronger shear force on the side of the ship or lighter.

The craft can be attached to the berthing modules by having personnel manually secure lines to mooring bits. However, ideally, the process would be completely automated.

A vacuum attachment system is a potentially effective technique for controlling lighters with reasonably smooth and rigid sides. The surface of the berthing modules can be a matrix of smaller "vacuum panels" which can separately grasp the side of the lighter when contact is made. It is estimated that a "pull" of 500 to 750 lbs per sq ft could be exerted on the vessel. In fact, a 15 by 50 ft berthing surface should be capable of exerting a pull of 108 kips for each psi of vacuum if attached, for example, to the side of a containership. With similar attachments fore and aft along the side of an LCU lighter or a containership, the vacuum technique could be a very effective technique for automatically securing both LCUs and containerships to the AACTS. With a suitable "adapter device", the vacuum concept might also be used with the LACV-30 lighter which has rubber skirts.

An attachment alternative for mooring the LACV-30 utilizes the lighter manipulator arms or additional robotic arms which connect to the fore and aft mooring bits to act as standoffs, positioning the LACV-30 in the seaway without the use of docking surfaces.

Potentially, the fore and aft motion capability of the 6 DOF berthing surface could be a means to warp a craft. Through control of the movement of the individual modules and their craft attachment mechanism, the array of modules could move the craft along the AACTS. To accomplish this, the modules would operate in a way similar to a group of people working together to haul in a rope. That is, while some people are pulling the rope along, others release the rope to shift their hands to a better position on the rope. Similarly, some modules would be attached to the craft and, through the use of the actuators, would exert a force to move the craft along the AACTS. At the same time, other modules would not be attached to the craft, but would be moving into a position to better attach to the craft. To utilize this capability would require that individual berthing module surfaces be shorter than the center-to-center spacing of the modules.

Normally, surface waves reflected from the side of a containership can add to the choppiness of the seaway for lighters alongside the ship. It is expected that wave reflections from the Delong barges will be less than those from the sides of the larger ships. Furthermore, another potential advantage of the berthing modules is that it is likely that the reflections will be broken up by the berthing modules, reducing choppiness in the lighterage area.

Figure 12:
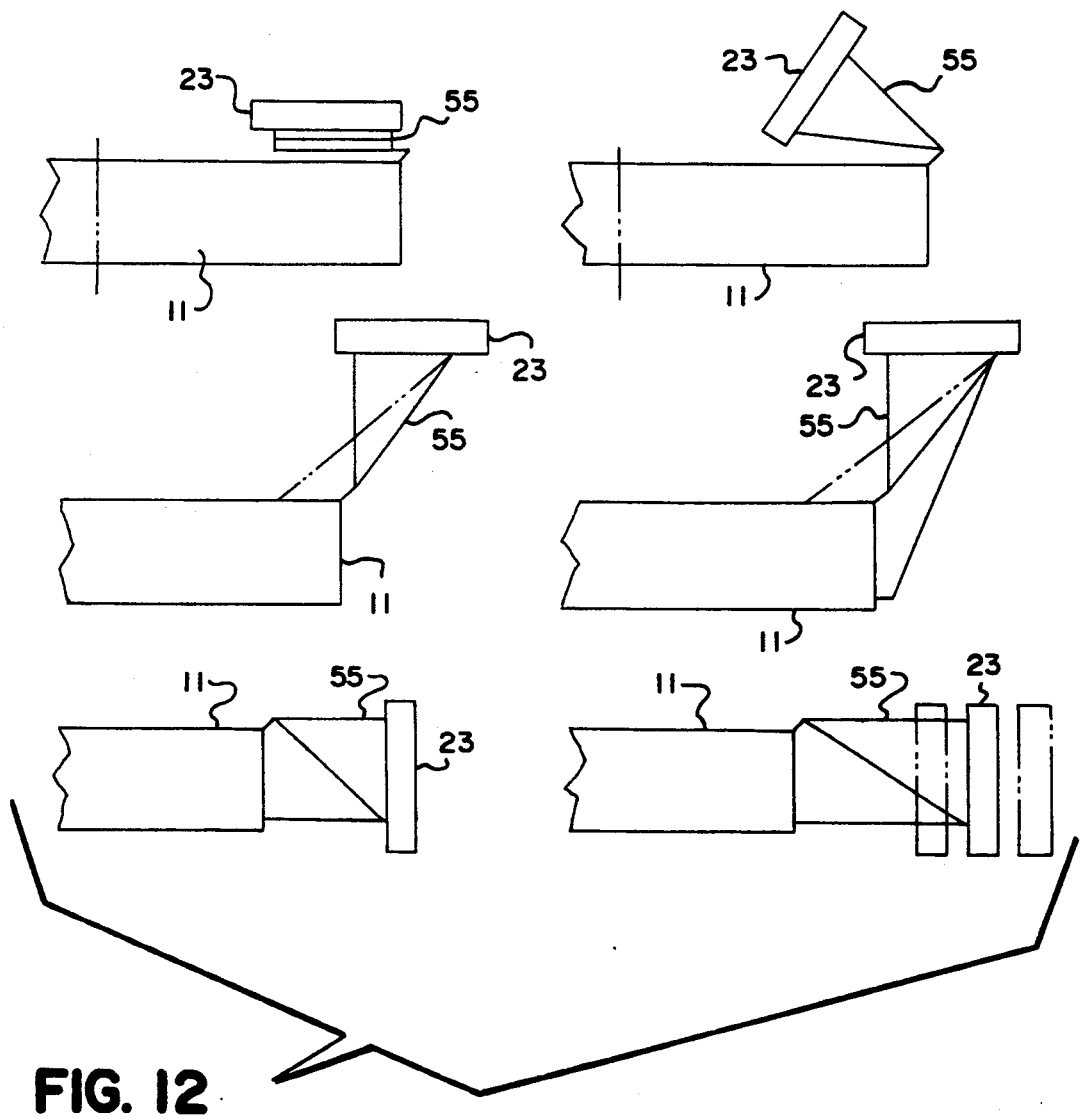
FIG. 12 is a sequential series of views showing stages in berthing module deployment.

In the transport mode, the berthing modules would be stowed on the deck of the Delong barges with the berthing surface facing up. To deploy the berthing modules, some of the brackets which hold the hydraulic actuators would be shifted from the deck of the Delongs to the sides. In this way, the surface of the berthing modules will be made parallel to the sides of ships or lighters. FIG. 12 illustrates one method to deploy the modules. A series of six sequential views are shown, showing stages or steps in the deployment process, from fully retracted at the upper left to fully extended at the lower right. Modules 23 are shown mounted on a barge 11 by actuators 55.

AACTS uses an elevated stable platform with four supports spaced 150 to 200 ft apart, each mounted on a separate floating barge, to provide the required system stability in heavy seas. The stable platform, also known as the transverse frame, provides a support structure for a system of manipulators to move the containers from the containership to the lighters.

The AACTS structure is designed to provide stiffness without excessive weight. The equilateral truss configuration provides torsional stiffness to resist deflections caused by lifting up to 35 tons at a maximum reach of 140 ft along the containership. With more than 70 ft of truss depth, the top member has a designed strength to lift two 35 ton containers at a maximum 140 ft reach across a containership while simultaneously withstanding 140 tons of sustained mooring forces from a docked containership.

All major load stresses enter the structure at the designed hard points, placing the major structural members into pure tension or compression. None of the large load forces will cause bending or shear forces on the main beams of the structure. Each of the major structural members are approximately 100 ft long and five ft in cross-section. The weight per foot varies, depending on the beams location in the structure and the resulting maximum expected load forces. The complete structure has 45 main structural beams, plus smaller members to support the buffer/conveyor system, power supplies and other necessary functions. The structural elements of the frame are shown as typical such members in FIG. 13 in which several typical and representitive conventional frame structures are designated 60, 61 respectively.

Figure 14:
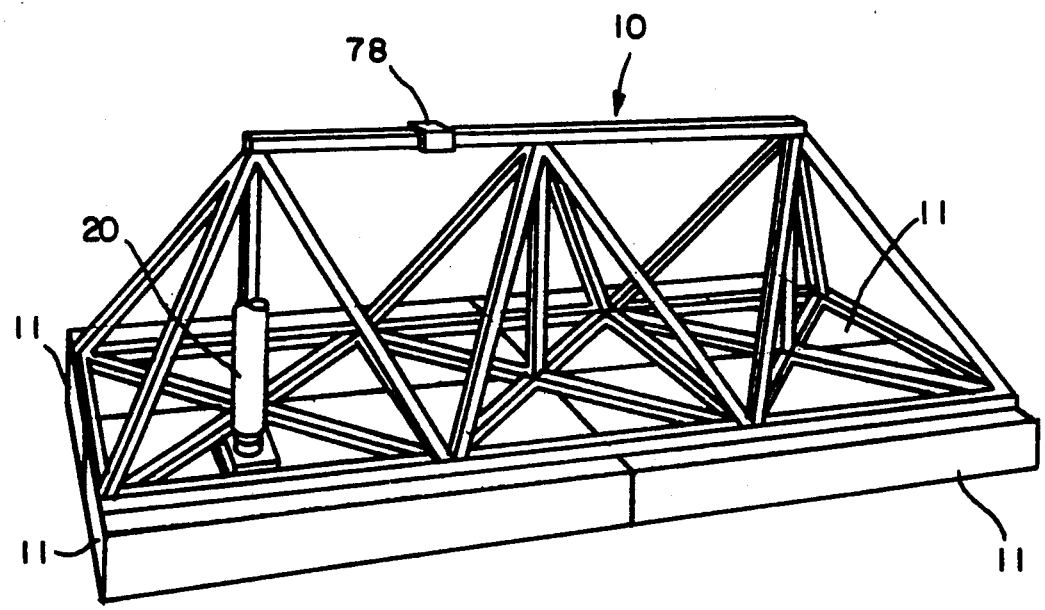
FIG. 14 is a perspective view of the transverse frame on four barges in a partially deployed condition.

The 100 by 300 ft assembly can be disassembled into four transportable modules each 50 by 150 by 75 ft high. FIG. 14 shows the basic AACTS transverse structure 10 being deployed on four B Delong barges 11. The four barges in this partially deployed state are nested together to form four contiguous corners, as shown.

Figure 13:
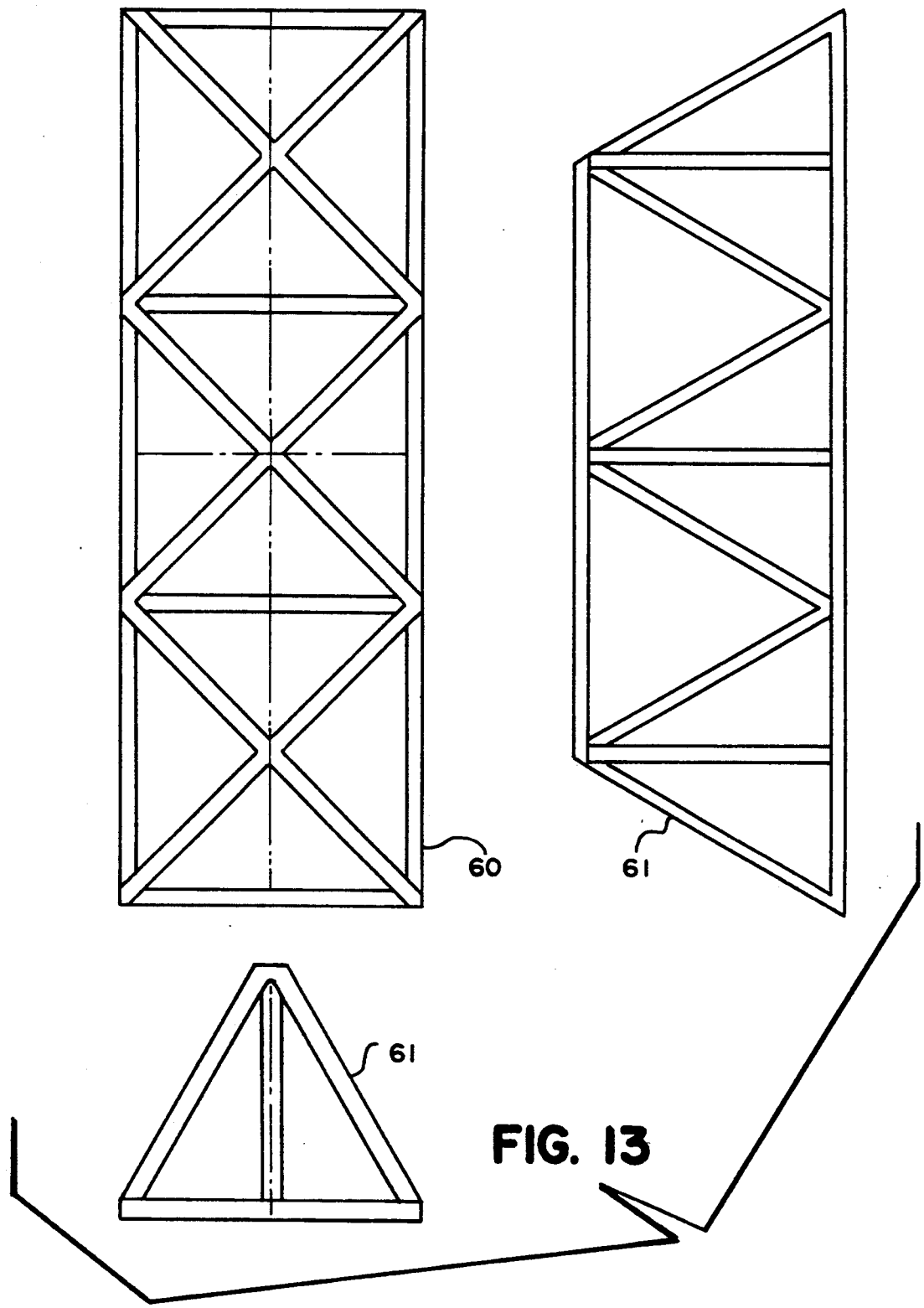
FIG. 13 is a series of views of elements of the transverse frame.

The main structure or transverse frame 10 is a triangular truss with two bottom members 300 ft long and 100 ft apart. Elements of this structure are shown in FIG. 13, as has been described. The top leg of the truss is 200 ft long and is centered approximately 71 ft above the two bottom legs. Each lower leg is connected to the single upper leg by six diagonals which connect to the ends and the midpoint of the upper member, and to the ends and the third points of the two lower legs of the truss. The two lower legs are connected together by four 100 ft members located at the ends and at the third points. The square spaces between the two lower legs and the respective diagonals to the upper leg form a four-sided pyramid; the complete truss takes the form of three four-sided pyramids with two tetrahedron shapes on either side of the middle pyramid. The square bases of the four sided pyramids have crossed diagonals with a vertical member connecting from the upper member to the center of each square.

Figure 15:
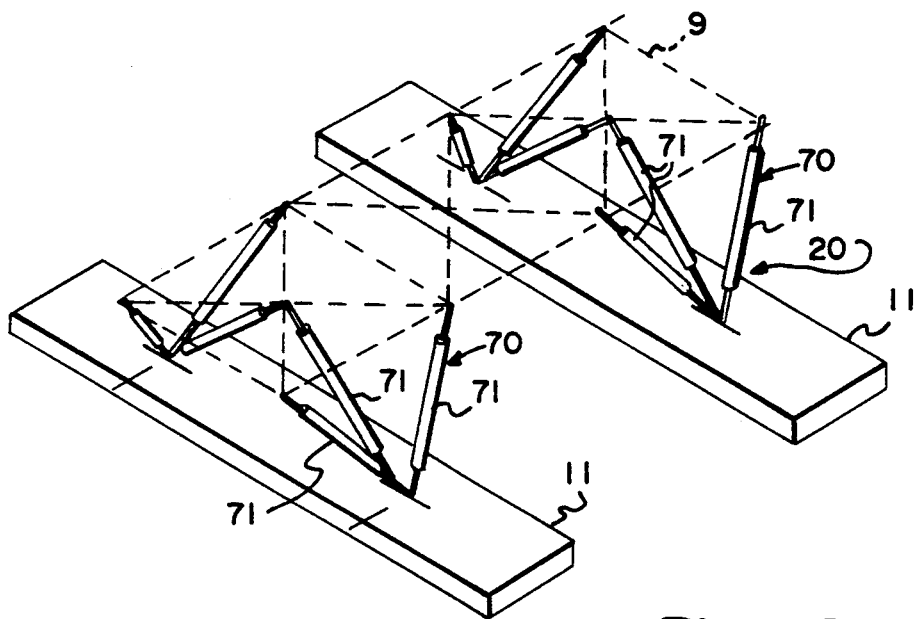
FIG. 15 is a perspective view of the actuators for the support of the transverse Frame.
Figure 16:
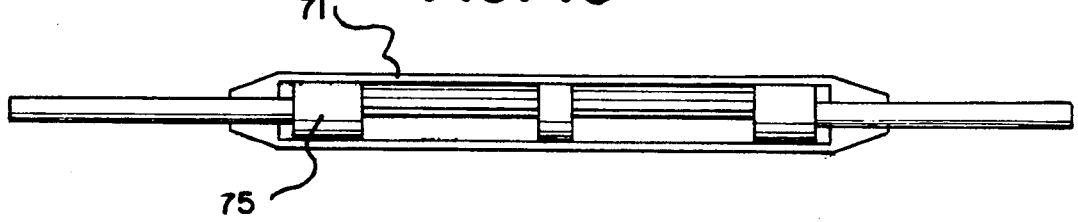
FIG. 16 is a schematic view of an actuator.

A total of 12 support points are provided for mounting the structure on the four Delong barges 11. FIG. 15 shows three combination pneumatic springs and hydraulic actuators 20 which connect from the base or underside of the transverse platform structure to each of the four support barges.

Mounting surfaces for two vertical supports for manipulator arms are provided on 100 ft centers at each end of the truss structure. The bases of the manipulator shoulder supports are located at each corner of the structure. The upper ends of the supports are tied to structural hard points to withstand the moments from loaded manipulators.

A maximum platform height of 70 to 80 ft is needed to permit the manipulator arms to reach over the containers on the deck of a ship. At this height, the lighterage can pass under the platform for loading in the space between the two ships.

The structure is built in four sections for ease in transporting and assembling at the operational site. Each "quadrant" contains one robotic manipulator arm for offloading containerships, one craft loading manipulator and an appropriate section of the container buffer/conveyor for moving containers from the shipside receiving dock to the lighterage loading dock. Provisions for operational and support facilities are also provided as required.

An important factor in determining design feasibility is to calculate the loads and stresses which might occur, and determine the resulting deflections and instabilities which might be encountered. A static analysis was made with each manipulator lifting 35 short tons and holding it at the maximum extended reach of 140 ft. With this reach, AACTS lifts or lowers containers on the opposite side of any containership.

The reactive load on the two barges at either end of the structure will be shared by the six air spring/hydraulic actuators which connect between hard points on the structure and the load support carriages on the four barges. The draft of the two barges will increase about 3 inches if both manipulators at one end were to simultaneously lift 35 tons each at the maximum reach of 140 ft straight out.

When each manipulator is supporting 70,000 lbs at right angles to the centerline of the structure, or along the side of the container-ship, a maximum tensile load of about 615 kips will be in the upper manipulator arm support truss connecting to the end of the upper truss member.

An objective of the AACTS is to reduce the impact of heavy seas on the ability to transfer containerized cargo offshore. Because of the AACTS's size, stability is greatly enhanced. Assuming no vertical motion compensation between the AACTS structure and the Delong barges (as the AACTS design, in fact, has), the maximum lengthwise tipping of the structure should occur when the two barges at one end are at the opposite part of an ocean swell from the barges at the other end of the structure. A 3.5 ft height differential between the two end supports would cause a one degree tilt in the structure, a 10.5 ft height differential would cause a three degree tilt and a 17.5 ft differential would cause a five degree tilt. Using manipulators, of course, tilt will not cause pendulation (as would occur using a crane system), although it may increase the stress. With the planned support system of air spring/hydraulic actuators, the barge motion would be counteracted and the AACTS structure would remain essentially stationary regardless of sea motions.

An option requiring further evaluation is the ballasting of the barges. If the barges are ballasted to reduce the freeboard to a minimum safe value, the vertical movement should be significantly less than the wave height and the stability of the structure support system should be improved. In this case, vertical adjustment to the height of the structure could be provided to maintain a relatively stable structure as the platform moves in the seaway.

The AACTS transverse frame support system is a key concept. Although the AACTS is positioned by an actively controlled mooring system and the berthing modules reduce craft motion, the AACTS, ships and lighters will move within certain tolerances, in the seaway. The support system compensates for any barge motion and fixes the transverse frame in space. This provides a stable platform for cargo transfer operations.

As shown in FIG. 15, the transverse platform or frame 16 is supported by four sets 70 of actuator systems 20. Each set 70 consists of three electro-hydraulic/pneumatic actuators 71 that form an inverted tripod. With an estimated gross supported weight of 750 tons, each set holds approximately 175 tons at a height of 50 to 70 ft above the deck of the Delong barge. Loads are transmitted to the center of each of the barges to provide the maximum support stiffness and to minimize vertical motion caused by pitching and rolling of the barges. Each actuator has a universal joint at the barge connection point to allow for barge rotation in three axes, i.e., roll, pitch and yaw. The universal joint would also provide for angular changes as the actuators adjust in response to barge motions in the seaway.

Operating in response to signals from an inertial guidance unit, the support system must adjust the length of each actuator to compensate for movements of the four supporting Delong barges, essentially like an intelligent load leveling system. The ability of the system to maintain stability is SS3 and higher makes automated transfer of containers under adverse conditions possible.

Vertical adjustments to the height of the AACTS structure will be provided during operation by changing the amount of air in the pneumatic cylinders and repositioning the electrohydraulic actuators between the movable carriage on the barge and the support points on the AACTS structure. Surge and sway motions of the barge can be compensated for by automatic adjustments of the hydraulic actuators. The actuator stroke requirements will depend on the amount of barge motion during SS3 operation. This will depend, in turn, on the characteristics of the facility mooring subsystem. The conceptual design provides for a 32 ft stroke with a maximum length of 100 ft.

Figure 17:
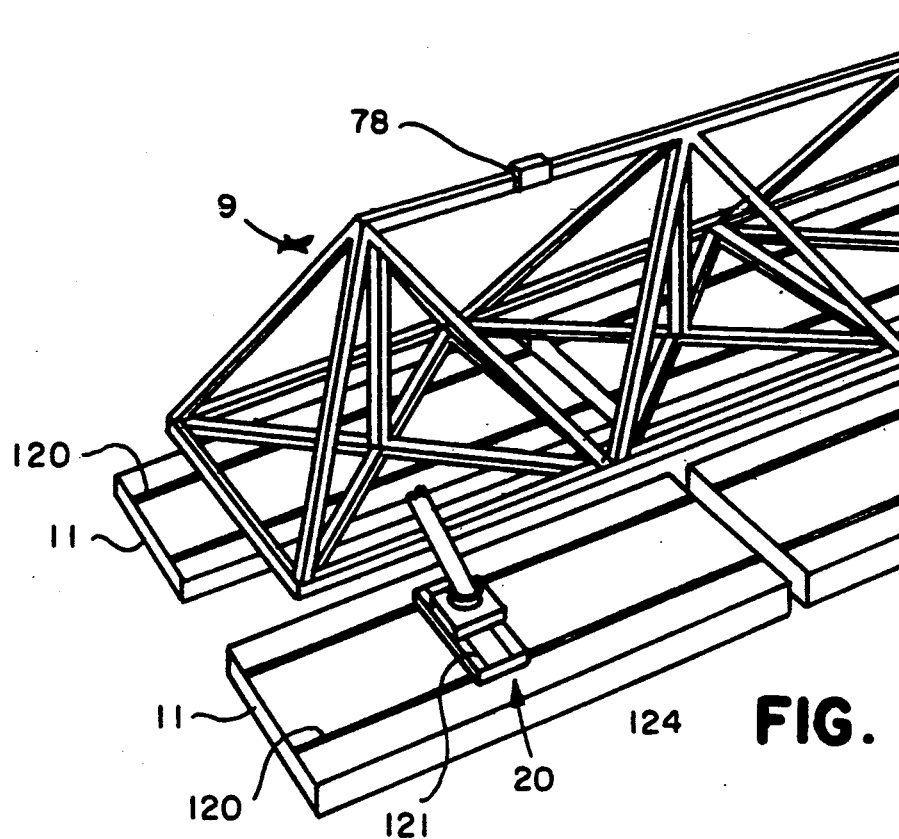
FIG. 17 is a perspective view of the interface between the barge and the transverse frame support system before barge deployment.
Figure 18:
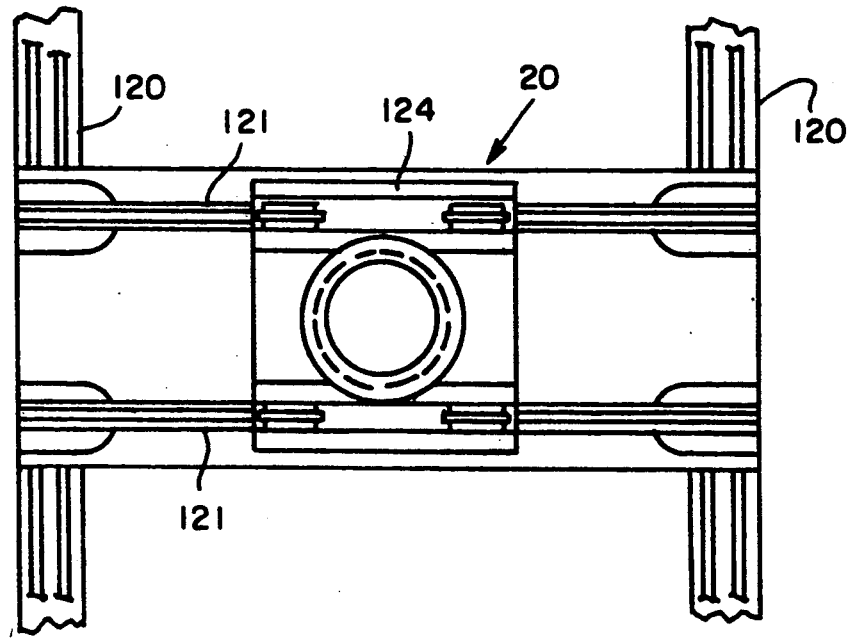
FIG. 18 is a schematic plan view of the interface between the barge and the support system.

As shown in FIG. 17, a connecting means is provided where appropriate on members making up the transverse frame 16, so the members may be assembled and disassembled. As shown in FIG. 18, a top running bridge crane 124 with a top running trolley having rails 120 and 121, at right angles to each other, provides translation at the barge 11 deck during deployment, and a means for spreading the load from the AACTS supports during operation. Furthermore, the horizontal motion capability provides additional relief from overstressing the structure if the barges should experience excessive movement in the seaway. A 50 inch ID cylinder on the trolley provides a convenient rotatable connection to the AACTS support subsystem.

Figure 19A:
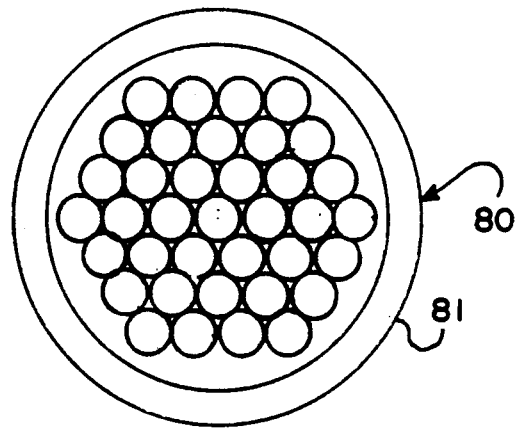
FIG. 19A is a plan view of nested pneumatic springs.
Figure 19B:
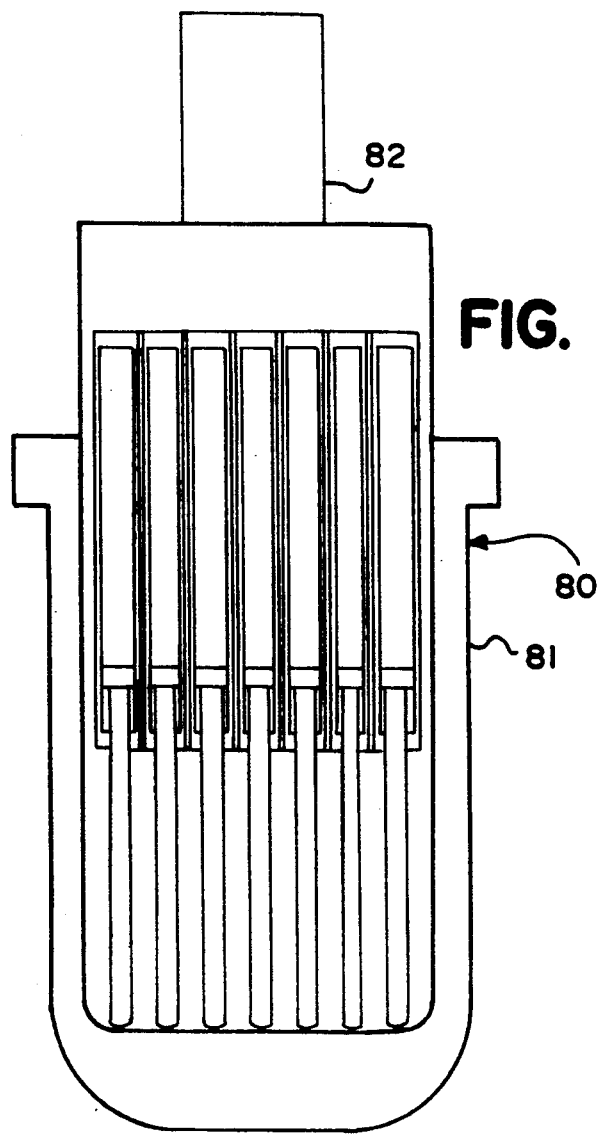
FIG. 19B is a side sectional view of nested pneumatic springs.

A 50 inch ID cylinder/piston assembly with a nested arrangement of 37 gas springs is shown in FIGS. 19A and 19B. The gas spring, generally designated 80 has a casing 81 and an extending piston shaft 82. It is a known device. Use of the gas springs at the connection to the barge can reduce the stroke requirements on the support system actuators by allowing relative motion (vertical) between the barge and the lower attachment point for the actuators.

The upper ends of the actuators connect through universal joints to hard points on the AACTS transverse frame, positioned such that each corner has a broad based inverted tripod connection to the barges. The resultant three DOF mounting allows the barges to heave, surge and sway within established limits while the AACTS platform is maintained in a stable position for container transfer operations.

For transport and redeployment, the support system design provides for lowering the AACTS structure to the barges. The two actuators at each corner which attach to the edge of the structure can be folded into the plane of the 100 by 300 ft base. The third actuator connects to the centerline of the structure through a movable mounting bracket. The structure is lowered by jacking the center actuator support up the vertical column, allowing the remaining two actuators to fold into position at the base of the column. Prior to lowering the structure, the 8 Delong barges are reconfigured to a 2 by 2 arrangement, allowing the structure to be lowered onto the four barges.

Figure 20A:
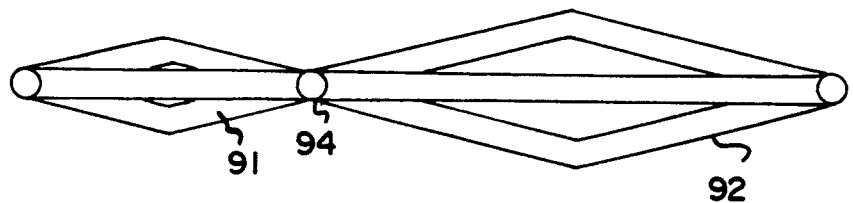
FIG. 20A is a plan view of a shipside manipulator arm.
Figure 20B:
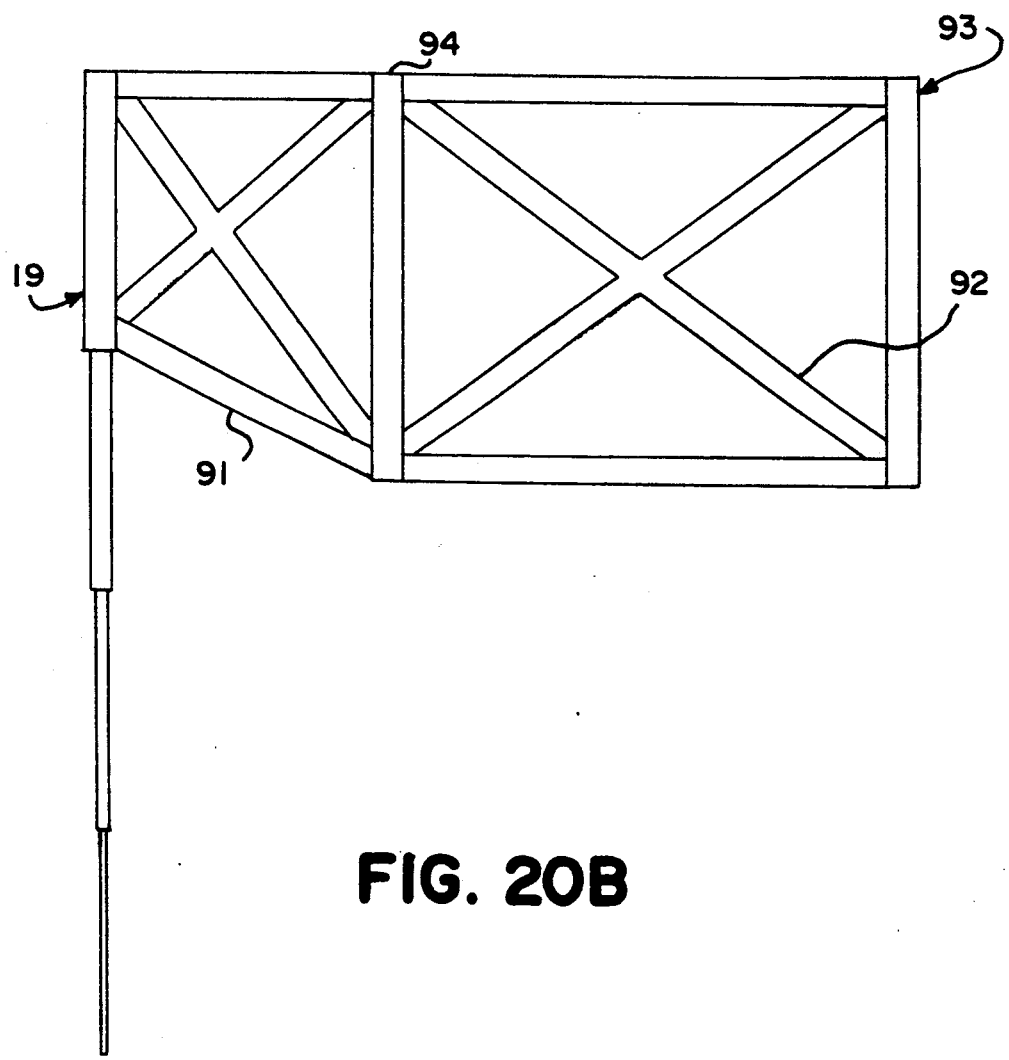
FIG. 20B is a side elevation view of a shipside manipulator arm.

A shipside manipulator or manipulator arm generally designated 19 is attached to each corner of the AACTS. These manipulators consist of four major subsystems: the upper arm, the forearm, the rigid hoist, and the intelligent spreader bar. This structure is best shown in FIGS. 20A and 20B.

The upper arm 92 and the forearm 91 provide movement in the horizontal plane. The combination of the upper arm and the forearm form a SCARA-like robot similar to those used in industry, where SCARA is an established acronym for Selective Compliant And Rigid Arm. By rotating about the "shoulder" 93 (juncture of the upper arm and AACTS frame) and the "elbow" 94 (juncture of the upper arm and the forearm) the arm can reach a large area of the ship. Each manipulator arm has a maximum horizontal reach of approximately 140 ft. Given a ship with a 100 ft beam, the AACTS system can access over 300 ft of deck length using both manipulators, thereby minimizing requirements to warp the ship.

The reach of the manipulator arm is such that it can pick up a container from the ship and deliver it directly to a lighter. Normally, however, the arm would deliver the container to a conveyor system that would move the container laterally to the lighter loading position.

The design of the upper arm must provide torsional stiffness to resist the twisting moment. For example, if the forearm is rotated 90 degrees from the upper arm while the hoist is lifting a full load of 35 tons, it is estimated that this could create a moment greater than 5 million lb ft.

While the upper arm requires high torsional stiffness, the forearm should not require such stiffness. Except for the moments produced by containers with offset centers of gravity, the forearm is not required to lift outside of its plane.

The upper arm can rotate 225 degrees about the shoulder axis and the forearm can rotate 315 degrees about the elbow axis. This permits the arm to pick and place containers at approximately 1200 sq ft on the platform between the manipulator arms, and also at any point in a 140 ft radius from the side of the containership to the AACTS structure (an area of greater than 15,000 sq ft).

To accommodate a vertical lift of approximately 120 ft from the hold of the ship to a clearance over the maximum container height on the deck requires a long (or telescoping) structure with good rigidity in both torsion and bending. A three stage compound (telescoping) actuator is expected to provide the required rigidity and strength to permit automatic pickup and positioning of the containers. The three telescoping sections, each 40 ft long, have diameters of 16, 20 and 25 inches.

In addition to its vertical movement, the rigid hoist is able to rotate the spreader bar 22 about the vertical axis. Once the manipulator arm is positioned over the target, the hoist moves in the vertical to place the spreader bar in close proximity to the target. The end of the hoist then rotates about the vertical axis to orient the spreader bar with respect to the container placement.

The automated containership cargo manifest (an existing feature in the Army's Standard Port System) and the ship's automated loading plan will provide location, size, weight and other data for each container. By combining this information with data from the sensors that report the ship and lighter attitudes, the manipulator arm will place the spreader close to the container location. However, fine-tuning will be required. This fine-tuning will be provided by the intelligent spreader bar control system.

The spreader bar will have a 6-DOF positioning system, similar to that used for the berthing modules. FIGS. 21A and 21B best show the spreader bar 22. The spreader bars will also be equipped with sensors to determine the exact position of the target container relative to the spreader. For example, the spreader bar sensor system may consist of a solid state TV camera and an array of ultrasonic range finders. In operation, the TV camera would be used to provide a video picture to the sensor computer system. The computer system would analyze the video image to determine the location of the edges of the container. The array of range finders would be used to form a 3-D image of the top of the container (or the deck of the craft). By combining the data from these sensors, the computer can determine the exact container position relative to the spreader bar. The computer would then develop the commands to position the spreader bar to mate with the container location. The spreader bar, generally designated 22, comprises connecting means 100 by which it is affixed to the manipulator arm, and a hydraulic actuator set 101 comprising a plurality of actuator cylinders 102. The main body 103 of the spreader bar is provided at its distal ends with cargo grasping means 104 of conventional construction.

The conveyor system 18 is located inside the transverse frame. It moves containers laterally between container loading/unloading platforms at the ship and lighter stations. The conveyor also provides for buffering of containers.

In normal operation, a container would be removed from the ship and placed on the conveyor shipside receiving platform. The conveyor would carry the container to a platform on the transverse frame above a waiting lighter. A lighterage manipulator arm would then lift the container off the conveyor and place it on the lighter. If a lighter was not in a position to receive a container, the container would remain, buffered, on the conveyor until a lighter was ready. The design is such that a number of containers can be buffered. This allows the shipside manipulator arms to work the ship with little regard for lighter availability.

The conveyor system will allow a container to move to any of the loading/unloading points on the transverse frame. This includes the four shipside locations and the four lighterage locations.

Figure 22:
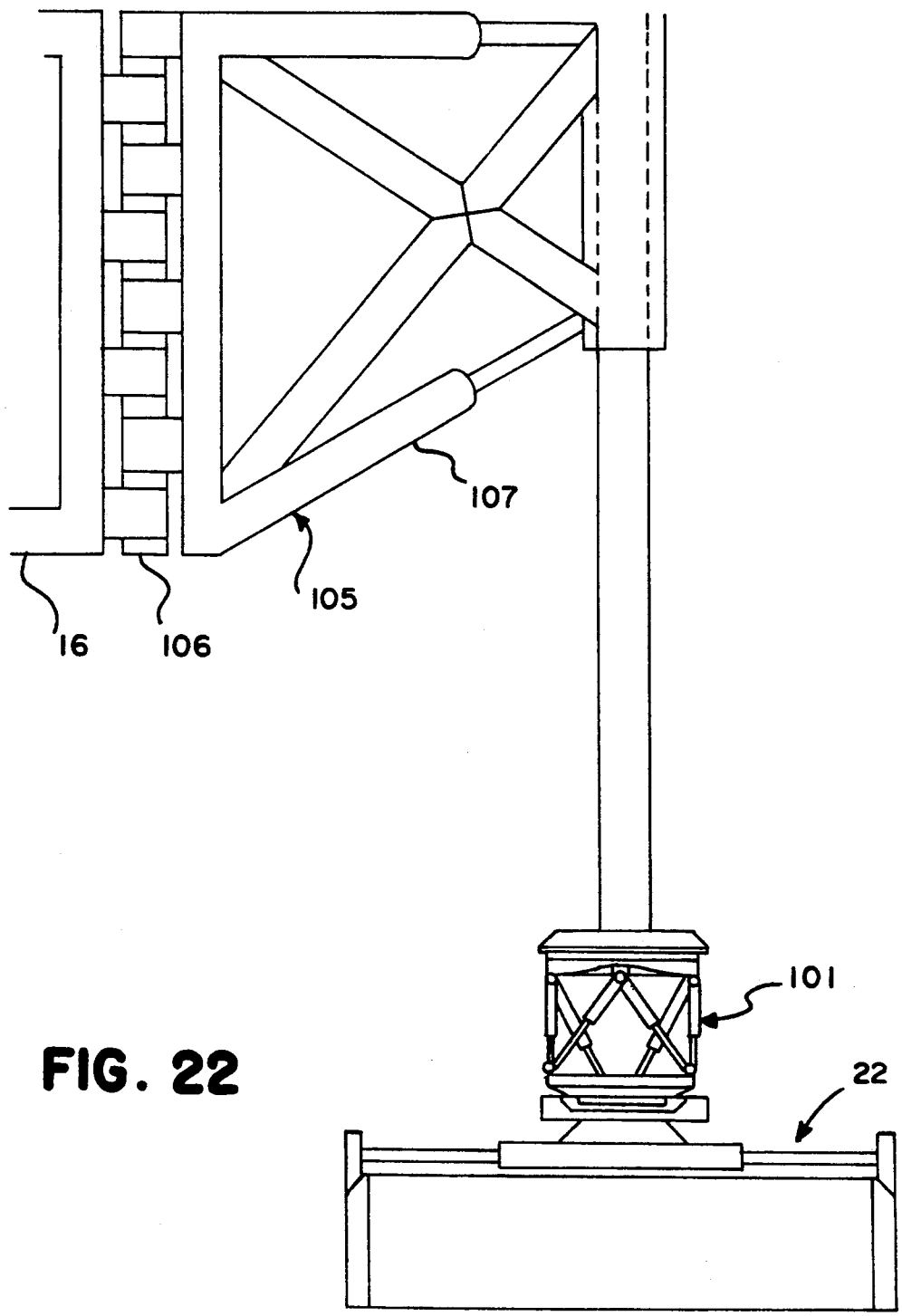
FIG. 22 is a side elevation view of a lighterage manipulator Arm.

In addition to the ship manipulators, similar manipulators will be used to transfer cargo to the lighters for loading in the central area between the two containerships. These robotic arms would be similar to the shipside arms, but would not include the upper arm portion because an extended reach capability is not required. This is shown in FIG. 22. In lieu of the upper arm, the lighterage forearm 105 is made move flexible. It is attached to the transverse frame 16 by a pivoting shoulder 106. The horizontal members consist of actuators 107 that will give the arm a basic radius of reach that can vary from 40 to 60 feet (a coverage of approximately 3000 sq ft). In addition, if the upper and lower actuators are set at different lengths, the radius of reach can be further extended (a coverage of approximately 8500 sq ft).

The power system will be required to provide both electrical and hydraulic power for operation of the interface stabilization systems and to operate the manipulators which transfer containers. Diesel engine or turbine type prime movers may be used to drive the hydraulic pumps and electrical generators or alternators. Hydraulic accumulators will be used to store hydraulic fluid under pressure to permit the operating systems to have peak powers greater than the maximum output of the prime movers.

Prime movers would be located in each quadrant, with interconnections provided to permit sharing between quadrants and with multiple hydraulic accumulators for storage.

Operation of the AACTS will require several thousand horsepower for operating the eight manipulators and the container buffer/conveyor system, as well as the ship/lighter interface stabilization modules. The use of four separate power sources (one on each barge) will add to the system reliability and will provide more efficient operation when less than full power is demanded.

Conventional power units can be readily adapted to meet the power system requirements. Either high torque dc type electrical motors or hydraulic pump/motors could be used to power the manipulators. Hydraulic actuators will operate the ship/lighter interface stabilization modules. Hydraulically powered self-tensioning winches for the mooring system have been in use for many years, although some controls development may be needed to integrate winch operations with positioning of the overall AACTS. Specifically, the constant tensioning controls could be placed with a computer controlled, variable tensioning, position feedback control system.

The manipulator arms will require power for their various movements. Manipulator power may be either electrical or hydraulic or a combination of electrical and hydraulic motors. Since speed is an important factor for achieving the desired cargo throughput, both vertical and horizontal movements should be at least 120 ft per minute, these operational requirements will determine the needed peak power.

The motion system for the berthing modules may be expected to exert or withstand forces of over 100 kips from containerships with a 30 knot beam wind. A 2000 psi hydraulic system with an equivalent cylinder diameter of 8 inches can withstand the 100 kips of force resulting from the 30 knot beam winds, so it is expected that the system should be capable of standing off much higher forces if necessary. Wave forces resulting from sea and swell will produce oscillatory forces and motions which are time dependent variables, and which will most likely be the single most difficult function for the AACTS to handle for SS3 and higher.

A principal attribute of the AACTS is system automation. AACTS automates the entire process of handling containers off shore. The operational features of the automation is shown in the various block diagrams that form part of this disclosure. The state of the art provides well known available implementations of the various sensing, feed-back, and control features.

The object of the automated control system is to insure that the cargo is handled in the safest and most productive manner. In basic terms, the automated control system will assist in the berthing of lighters and ships, reduce the relative motion between the AACTS and the lighters, keep the AACTS frame stable, control the cargo handling manipulators to provide accurate placement and removal of containers, control the container conveyor system, maintain correct mooring of the AACTS, manage safety systems, and provide timely and accurate information to the system operator.

In addition, the automated system will be complemented by a manual override system which will give the operator full control of the system and its components.

The AACTS control system will perform all of these functions using a distributed processor system design. The use of distributed processors will permit the system to be designed and tested in a stepwise manner, ease maintenance and repair, maximize system reliability, and minimize system cost.

State-of-the-art techniques will be employed throughout the system. Modern methods of materials handling used in today's robotics based automated factories is applicable for "picking" and "placing" the cargo. The 6 DOF motion base technology used in the latest flight simulators provides the flexibility needed to mechanically follow moving lighters and containers. The algorithms used to coordinate the manipulator movement with the containers moving with the ship or lighter are similar to those used in fighter aircraft to lock onto, track, and intercept moving targets. Artificial intelligence in the form of an expert system will aid in the stowage and unloading plans to ensure that the most efficient cargo handling assignments are made.

Figure 23:
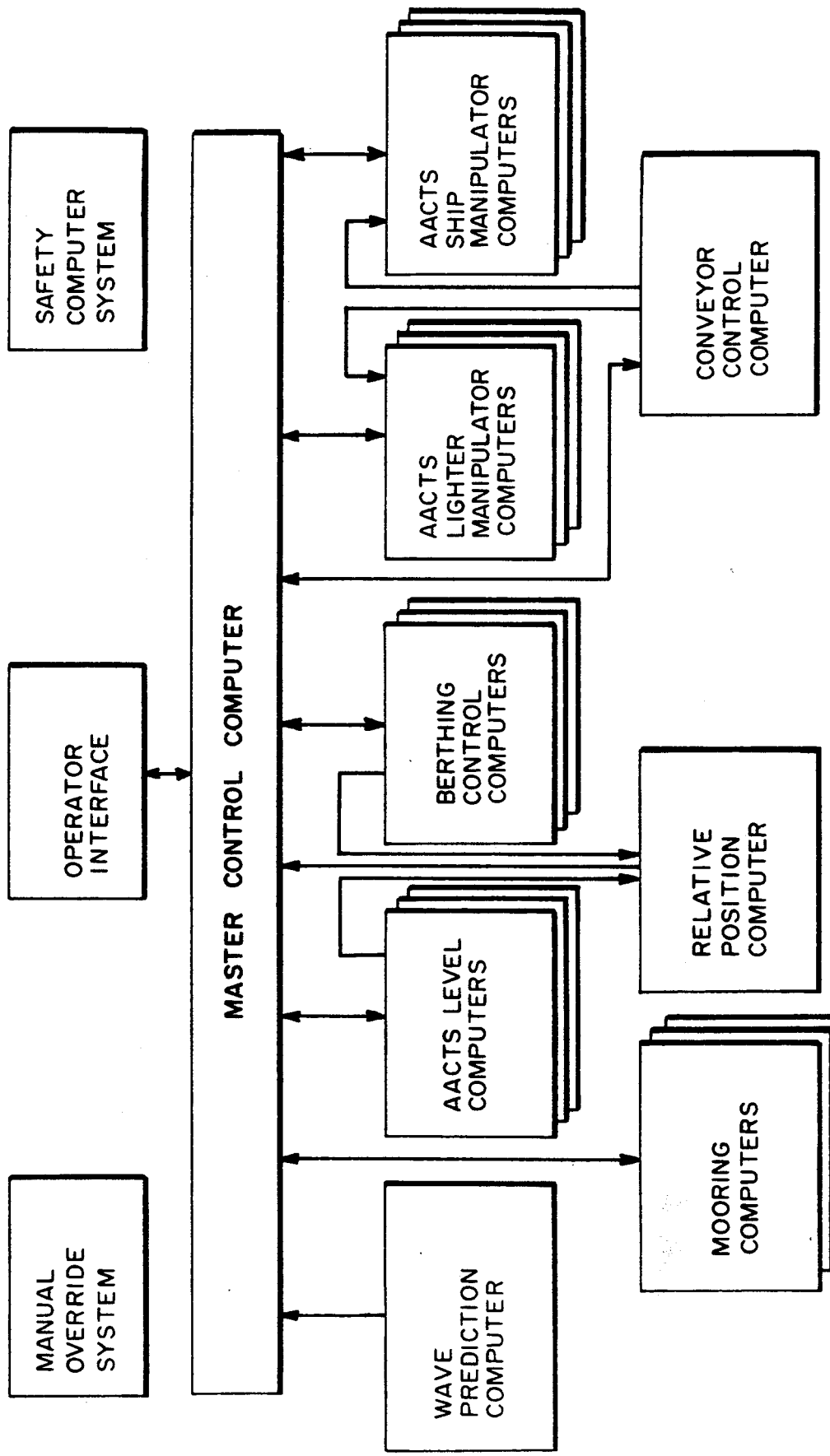
FIG. 23 is a block diagram of the automated control system.

A block diagram of the automated control system is presented in FIG. 23. The operational blocks include:
Master Control Computer
Operator Interface
Wave Prediction Computer
Mooring Computers
Leveling Computer
Berthing Control Computers
Relative Position Computer
AACTS to Lighter Manipulator Computers
AACTS to Ship Manipulator Computers
Conveyor Control Computer
Safety Computer
Manual Override System The basic hardware blocks of the individual processors are discussed briefly below. In the block diagrams conventional and known details such as Analog to Digital Converters, and Multiplexers are omitted for clarity.

As shown in FIG. 23, the Master Control Computer is the hub of the distributed control system. The Master Control Computer manages the system global data, coordinates the system communications functions, performs the system safety functions, controls the stabilization functions, manages the various cargo handling devices, manages the berthing and warping functions, and provides operator interface.

The Master Control Computer will base many of its control decisions on data provided from a number of sensors instantaneously reporting ship and lighter positions relative to the AACTS. In addition to the data regarding the instantaneous position, the Master Control Computer will predict what the relative positions will be for the next computational frame. Computational frame is defined as the time required for the Master Control Computer to make one pass through its main control loop, a small fraction of a second. The prediction calculation will be supported by velocity and acceleration feedback sensors, as well as data provided by the Wave Prediction Computer. Predictions based on acceleration and velocity are commonly used in control systems, but the use of a Wave Prediction Computer is unusual.

Figure 24:
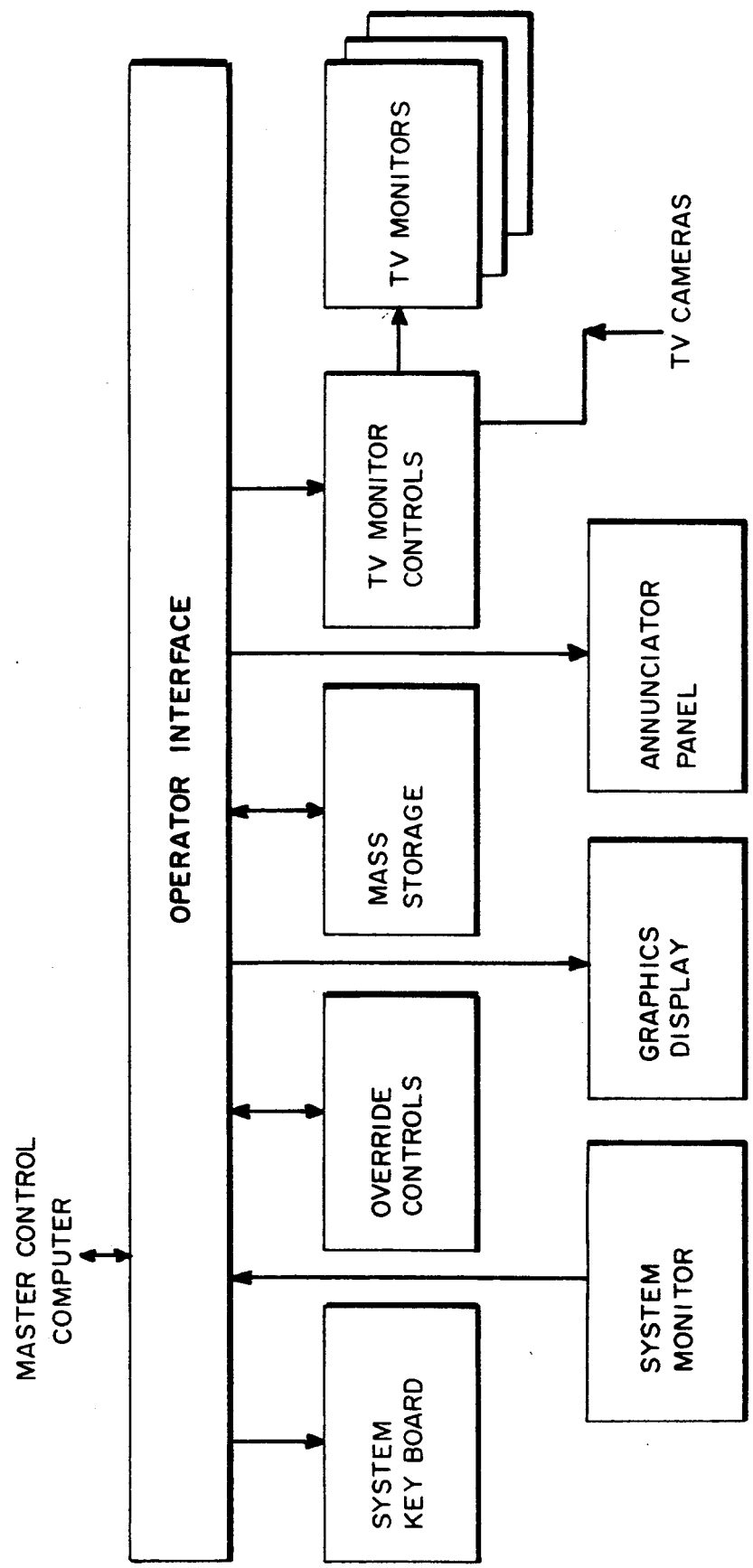
FIG. 24 is a block diagram of the operator interface.

Through the Operator Interface, shown in block diagram in FIG. 24, the Master Control Computer is provided with information such as facts regarding ships, lighters and containers. This information includes general data related to the physical configuration of various containerships and lighters and data specific to the current operation such as ship cargo manifest, ship stow plans, lighterage queues, and cargo.

The Operator Interface also provides information from the AACTS to the operator. This information includes the status of the various systems and subsystems, and a real-time graphic display of the location of cargo moving through the AACTS. The Operator Interface will also provide emergency controls and a bank of television monitors that display the activity at various locations within AACTS.

The System Monitor and System Keyboard are the standard input output devices for the Master Control Computer. Through these devices the operator can set up and control the AACTS automated system. The operator can provide information such as facts regarding the current status of ships, lighters and containers.

The Graphic Display will present the operator with a real-time view of AACTS activities. It is anticipated that through the use of the Graphics Display an operator will be able to monitor each container in the system, the current positions of the manipulator arms, the attitude of the transverse frame, and status and position of each lighter.

In addition to the Graphics Display a conventional Enunciator Panel will be used to display the operational status of critical components. The displays will include such items as safety interlocks, temperatures, and pressures.

A number of television cameras are strategically located throughout the AACTS. Through the use of the TV Monitor Controls and TV Monitors, an operator will be able to efficiently observe critical operations. Override Controls are provided to safely terminate automatic operations.

Mass Storage will be provided with the Operator Interface so that data can be entered and transferred to the system. For example the ship's manifest may be rapidly loaded onto the Mass Storage device.

Figure 25:
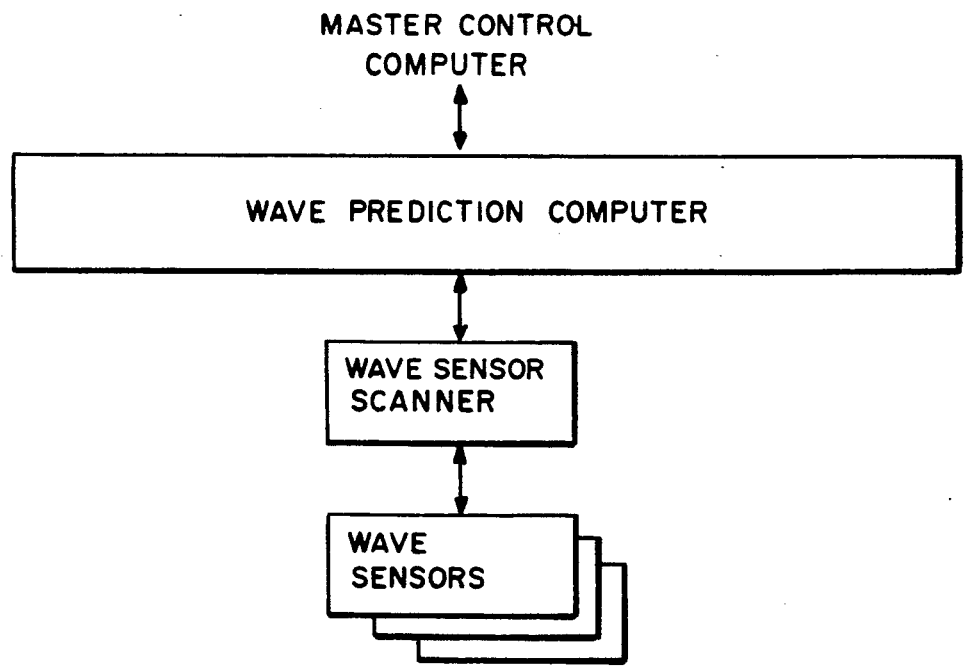
FIG. 25 is a block diagram of the wave prediction computer.

The Wave Prediction Computer, shown in block diagram in FIG. 25, monitors wave activity in the vicinity of AACTS, predict activity for the next computational frame and provide the information to the Master Control Computer. While accurate wave predictions are normally considered to be extremely complex, it is anticipated that AACTS will reduce the complexity by employing a large number of sense points and by limiting the prediction to a very short time.

A large number of Wave Sensors will be located in the AACTS vicinity. Non-contact sensors, such as ultrasonic, microwave, or laser range finders, are preferred because of their logistic simplicity. The sensors will continuously monitor and measure the relative heights of the waves in the vicinity of the AACTS.

Data from the Wave Sensors will be read into the Wave Prediction Computer through the Wave Sensor Scanner. The Wave Sensor Scanner is simply a multiplexer that will read each wave sensor one at a time and pass the readings to the Wave Prediction Computer. The Wave Prediction Computer will then calculate an expected activity for the next computational frame and provide to the Master Control Computer a "topographic map" of the ocean in the AACTS vicinity. The map may include velocity, acceleration and energy as well as expected displacement. To reduce computational complexity and error, a large number of sample locations and a high sampling frequency are anticipated.

Figure 26:
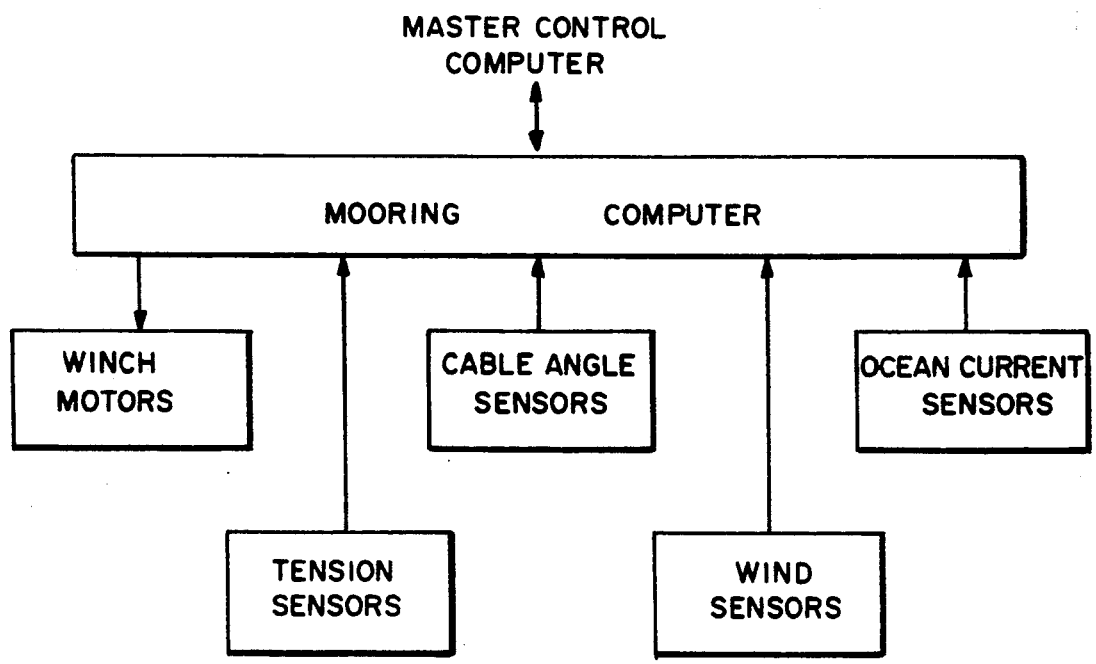
FIG. 26 is a block diagram of the mooring computer.

As shown in the block diagram of FIG. 26, the Mooring Computer will control Winch Motors that can let in/out the AACTS mooring lines in order to optimally secure the AACTS. The Mooring Computer will monitor Wind and Current Sensors, as well as Tension Sensors and the Cable Angle of the various mooring lines.

The sensor information will be passed onto the Master Control Computer which, together with the information on the attitude of the lighters and ships, will develop commands for the winches based on the AACTS global situation.

Figure 27:
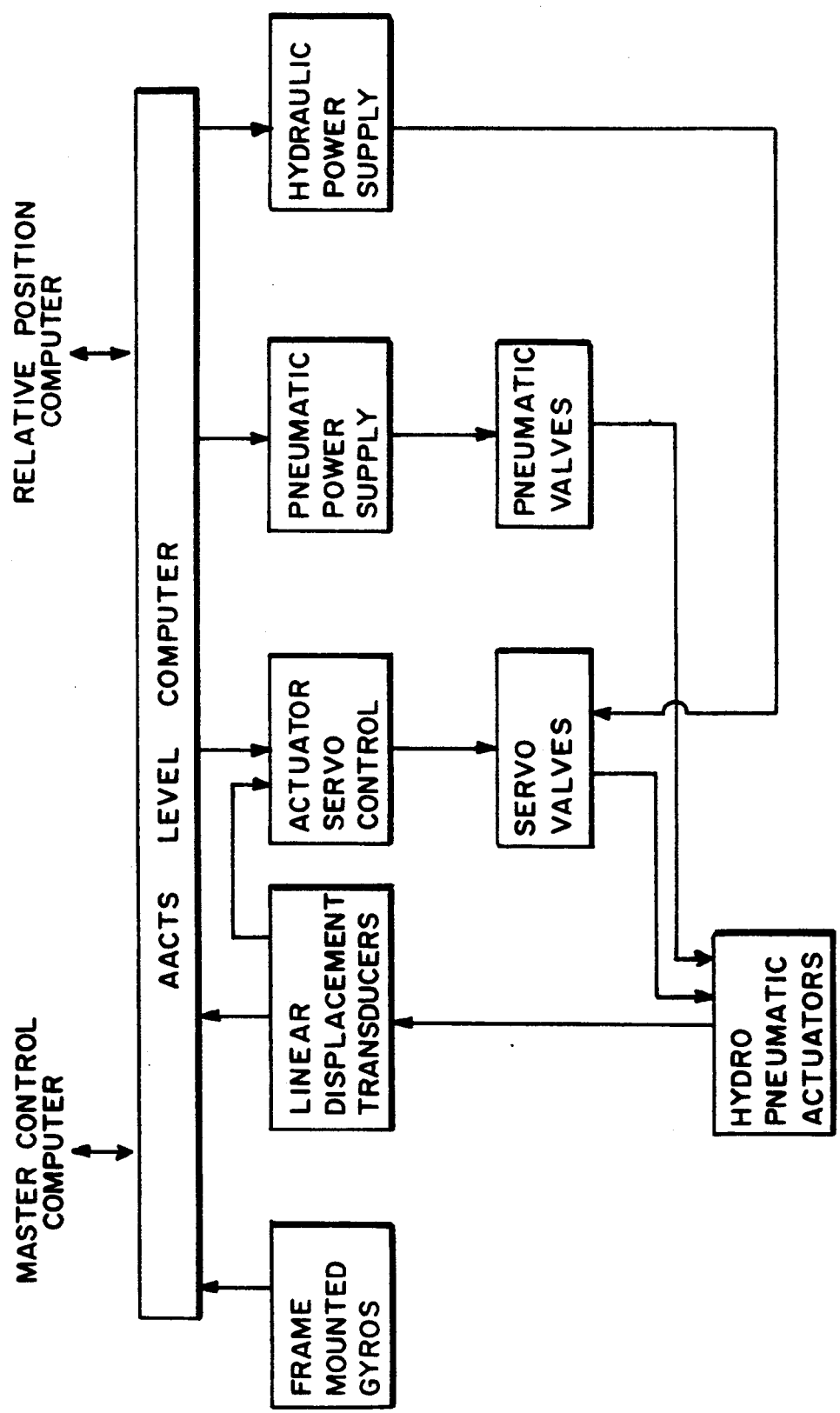
FIG. 27 is a block diagram of the leveling computer.

The Leveling Computer, shown in block diagram in FIG. 27, will provide the Master Control Computer with feedback regarding the position of the transverse frame. The Leveling Computer will monitor the Frame Mounted Gyros in the AACTS and calculate the attitude of the frame with respect to the horizontal plane. Linear Displacement Transducers will measure the length of the supporting Hydro-Pneumatic Actuators that form the four support tripods. The resulting information will be used by the Master Control Computer to determine what commands will be given to the legs of the various tripods. In this way, the AACTS frame can be held level and fixed in space (to within a predetermined tolerance).

The length data will also be fed back to the individual Actuator Servo Control electronics which control the Hydraulic Servo Valves. It is expected that the Pneumatic Valves will be controlled directly by the Leveling Computer.

The Leveling Computer will also control the Hydraulic and Pneumatic Power Supplies which supply power to the Hydraulic-Pneumatic Actuators. The Hydraulic and Pneumatic Power Supplies include motors, pumps and accumulators.

Figure 28:
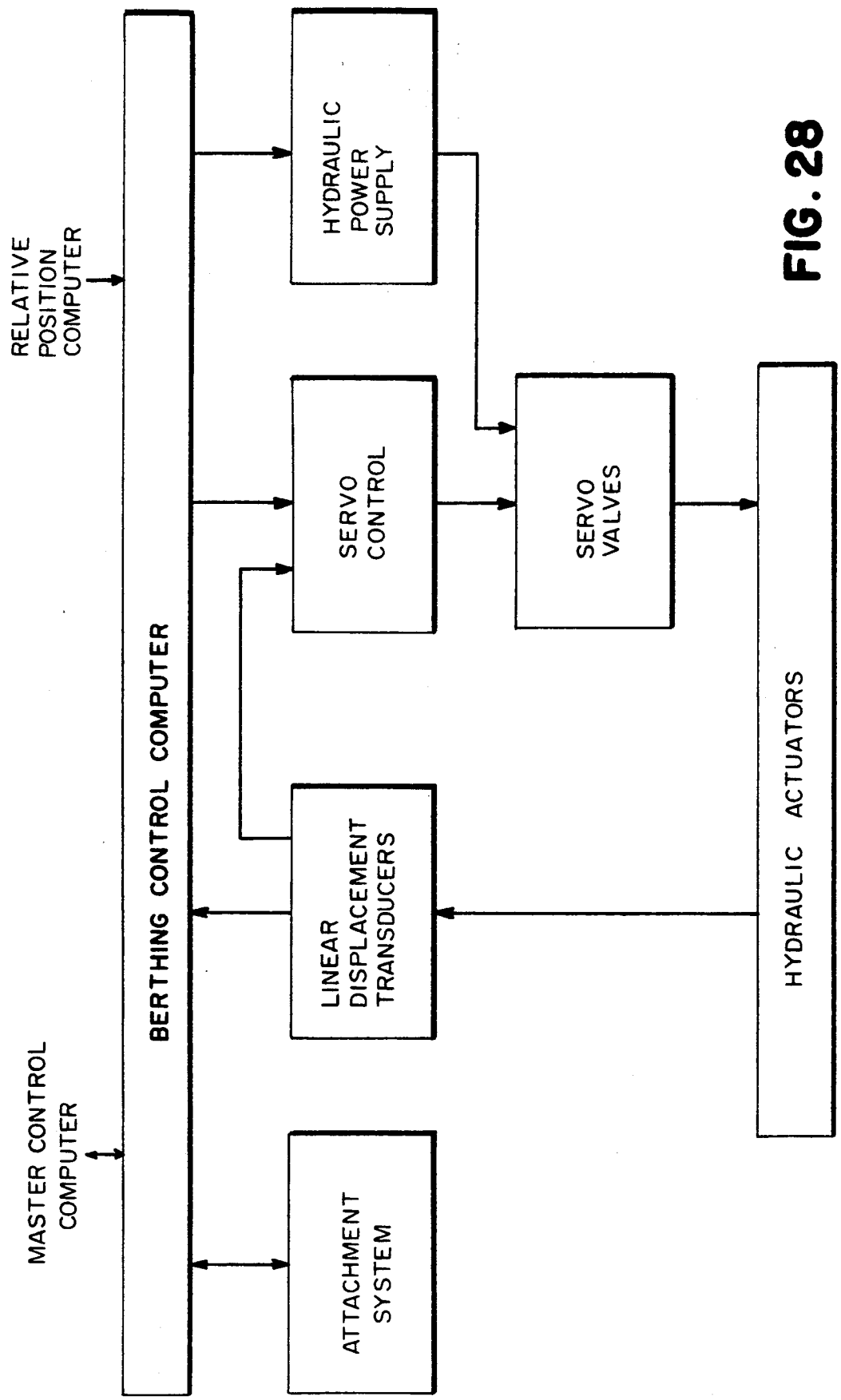
FIG. 28 is a block diagram of the lighter berthing computer.

The Berthing Control Computers provide assisted berthing of the ships and lighters. While they are very similar, there are two types of Berthing Control Computers, one for the ship and one for the lighters. It is planned that there will be one of each type of computer per Delong barge (for a total of 8 berthing computers). FIG. 28 shows the block diagram of the lighter berthing computer.

The lighter Berthing Control Computer accepts position commands from the Master Control Computer for the desired attitude of the lighter. The position is given in terms of Roll, Pitch, Yaw, Heave, Surge and Sway with respect to the Delong barges. The Berthing Control Computers must perform a real-time coordinate conversion to change the data into actuator leg lengths for each of the berthing modules. Each module is supported by six Hydraulic Actuators that form a synergistic 6 DOF platform. Once the desired leg lengths are calculated, the length commands can be passed on to the actuator Servo Control subsystem which controls the length of the Hydraulic Actuators. The Servo Control sends command to the Servo Valves. The length of the actuators are fed back to the Servo Control subsystem and the Berthing Control Computer via the Linear Displacement Transducers.

The Berthing Control Computer will perform a reverse coordinate conversion calculation to present the Master Control Computer and the Relative Position Computer with the actual attitude of the lighter. The Master Control Computer will use the information to control the Lighter Manipulator Computers.

The Berthing Control Computers also control the Hydraulic Power Supply for the Hydraulic Actuators.

The lighterage Berthing Control Computer also controls the operation of the Attachment Systems. One Attachment System is mounted on each of the berthing modules. One expedient is a vacuum gripper to attach the berthing modules to the side of the lighters. In operation, the individual berthing modules would be positioned by the Master Control Computer to ease an approaching lighter into position at the AACTS. The Attachment System would be turned on when the Lighter is in contact with the berthing module.

Because the berthing modules can independently move in 6 DOF, and the Attachment Systems can be turned on and off, the Berthing Control Computers can reduce the motion of the lighter. This system could also warp lighters through the craft loading area by controlling the motion of various berthing modules. The Berthing Control Computers could also automatically cast off lighters. These activities would be under the control of the Master Control Computer.

The Ship Berthing Control Computers are similar but much simpler. They consist of the Servo Control, Servo Valves, Linear Displacement Transducers, and Hydraulic Power Supplies to control the berthing modules on the ship side.

Figure 29:
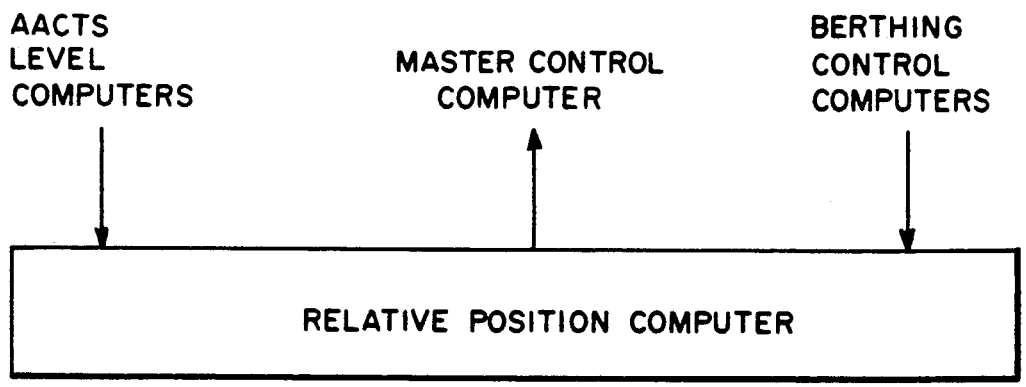
FIG. 29 is a block diagram of the relative position computer.

The Relative Position Computer, shown in block diagram in FIG. 29, is not complex. This computer is used strictly for computation, not control. The Relative Position Computer takes the attitude information from the Berthing Control Computers and the Leveling Computer and computes the position of the Lighters with respect to the transverse frame.

Figure 30:
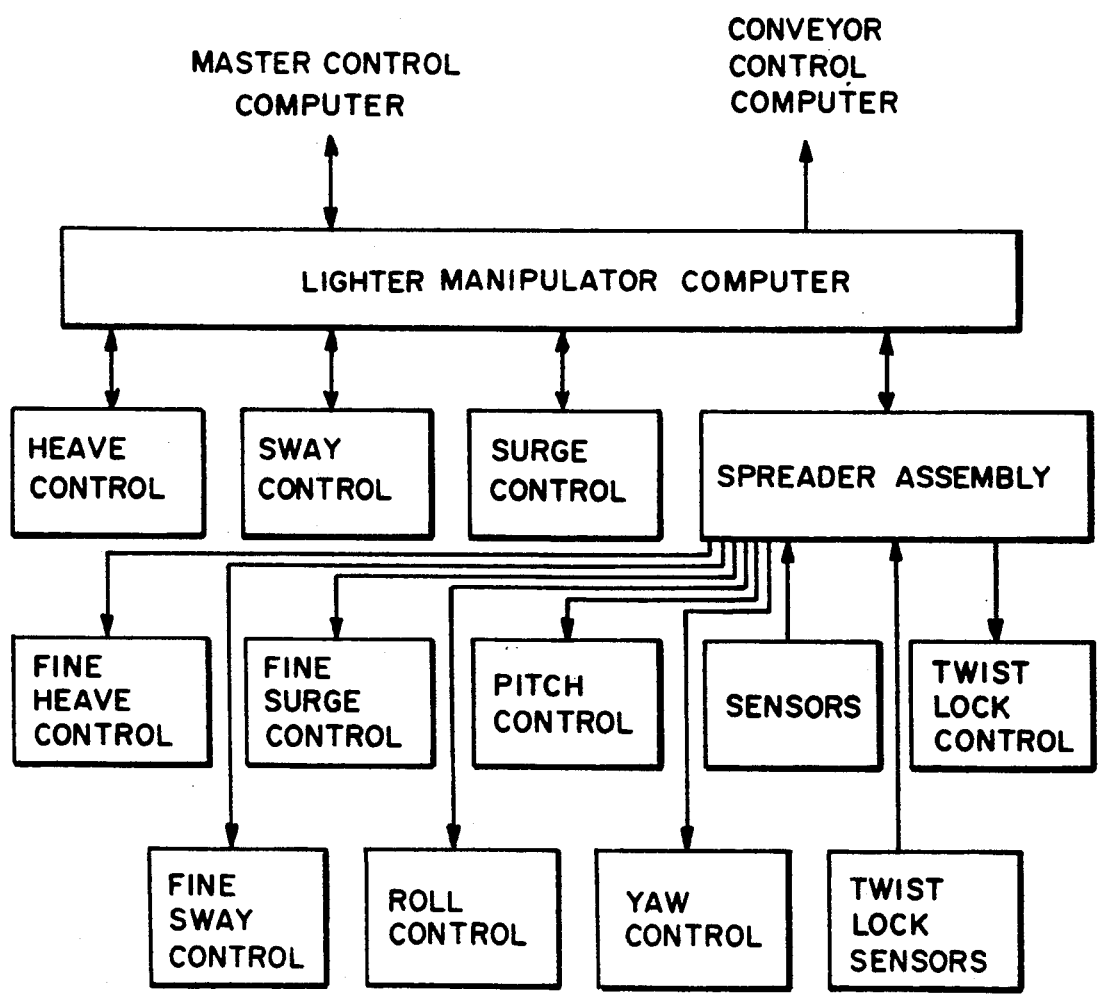
FIG. 30 is a block diagram of the lighter manipulator computer.

The Lighter Manipulator Computers, shown in block diagram in FIG. 30, receive commands from the Master Control Computer. The command tell the Lighter Manipulator Computers the relative coordinates in space of a target container location and what actions to perform (pick up/put down). The Master Control Computer commands will be relative to the transverse frame. The Lighter Manipulator Computers will take the information provided by the Relative Position Computer and determine where in space the manipulator should place the spreader.

The Lighter Manipulator Computers must convert the desired location into commands for the manipulator position control. The Lighter Manipulator Computers must control the position of the manipulator arm in the Heave direction; as well as the position of the arm in the Sway and Surge directions.

The commands from the Master Control Computer will help the Lighter Manipulator Computer move the manipulator arm into a position local to the targeted location. The Spreader Assembly will execute the movement required to move the spreader into the exact location. The Spreader Assembly is expected to be capable of motion in 6 DOF, with fine positioning in Heave, Sway, Surge, Pitch and Roll; and extended motion in the Yaw direction.

The fine spreader motion will be provided by a set of six hydraulic actuators similar in principle to those used on the berthing modules. The fine position commands will be developed by the Lighter Manipulator Computer. Sensors located on the spreader assembly will feed information regarding the spreader's proximity to the targeted location.

It is anticipated that multiple stages of sensors may be employed. For example one concept uses a solid state TV camera, an array of ultrasonic range finders and contact sensors. In this concept the TV camera, equipped with a wide angle lens, feeds a digital video image to the computer. The computer then processes the image in order to recognize the outline of the target container. Based on the outline, the computer generates the commands to center the spreader over the container. The array of ultrasonic range finders then measure the distance between the spreader and various points on the container roof. With this data, the computer can compare the angle of the plane of the roof with the angle of the spreader. The computer will adjust the 6 DOF spreader until its plane is parallel with the container roof. The spreader will be moved closer to the container with the distance measured by the ultrasonic range finders. As the spreader makes contact with the container, proximity sensors will provide the information needed to finely adjust the spreader bar to the container.

The Lighter Manipulator Computer will coordinate the spreader bar sensor information with the Master Control Computer commands to gently move the spreader into position, thus tracking and rendezvousing with the moving target that is the desired container location. In addition, the Lighter Manipulator Computer will perform a coordinate conversion to set the actuator length so that the desired position is attained.

The Sensors and Spreader Assembly control will position the spreader in the exact targeted position. At that time the Lighter Manipulator Computer will employ the Twist Lock Sensors and Twist Lock Control to engage or release the containers. It is understood that specific individual element improvements, such as improved twist lock devices, do not alter the inventive concept of the system.

Figure 31:
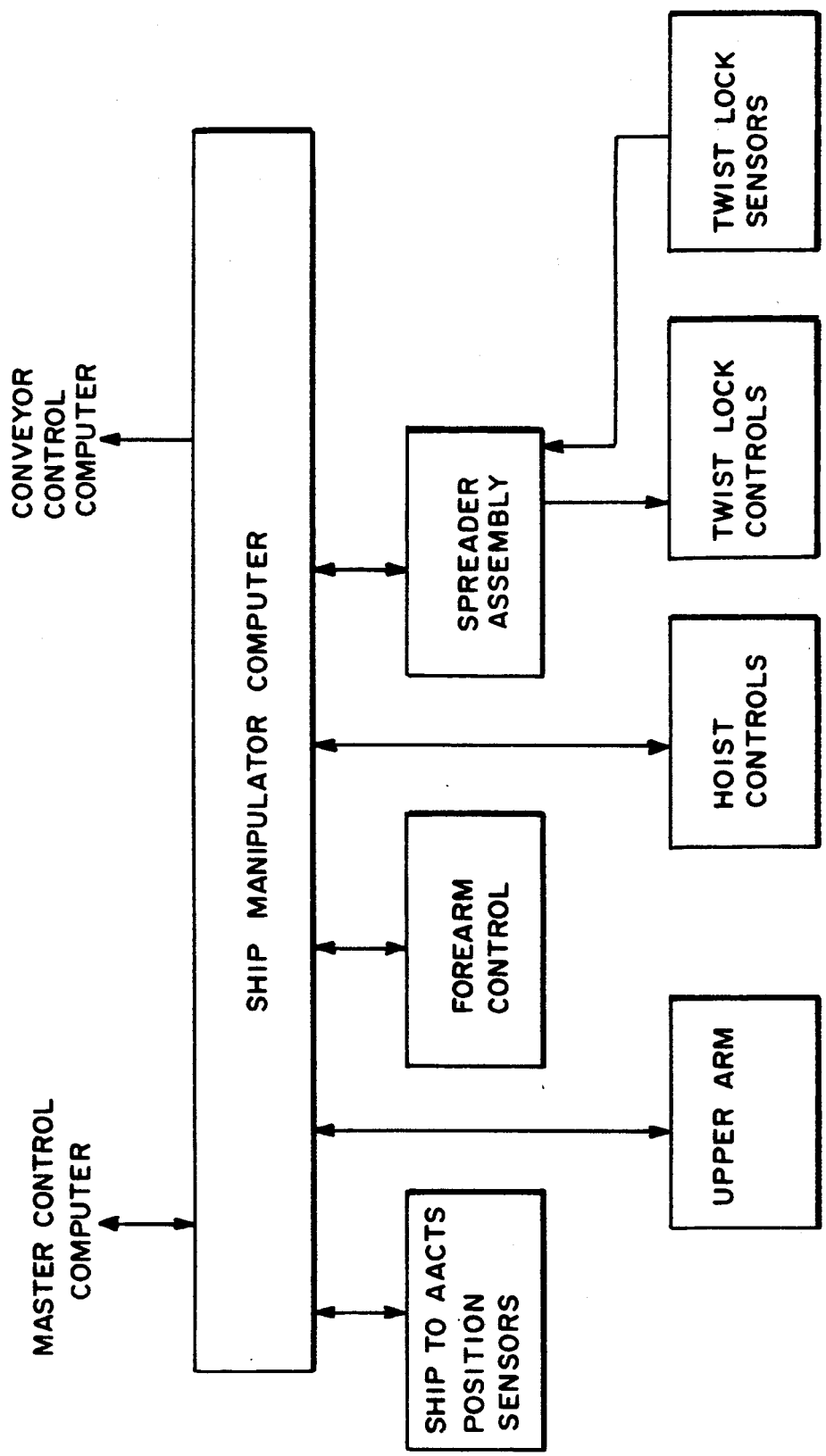
FIG. 31 is a block diagram of the ship manipulator computer.

As shown in block diagram in FIG. 31, the Ship Manipulator Computers are similar to the Lighter Manipulator Computers. The Ship Manipulator Computers receive commands from the Master Control Computer. The commands tell the Ship Manipulator Computers the coordinates of a container location in the ship and what actions to perform (pick up/put down). The Ship Manipulator Computers must calculate the relative position of the container location based on Ship to AACTS Position Sensors.

The Ship Manipulator Computers will convert Master Control Computer commands into individual commands for the manipulator "Upper Arm," "Forearm," Hoist, and Spreader. The commands from the Master Control Computer will bring the manipulator to the vicinity of the target container location. As with the lighter manipulators, fine position and control will be performed with the aid of sensors local to the spreader.

Once the spreader is at the target location the Ship Manipulator Computer will use the Twist Lock Controls and Twist Lock Sensors to engage or disengage the containers.

The commands of the Ship Manipulator Computer will be governed by the Manipulator Interlocks to insure that the arms do not interfere with one another or produce any unsafe condition.

Figure 32:
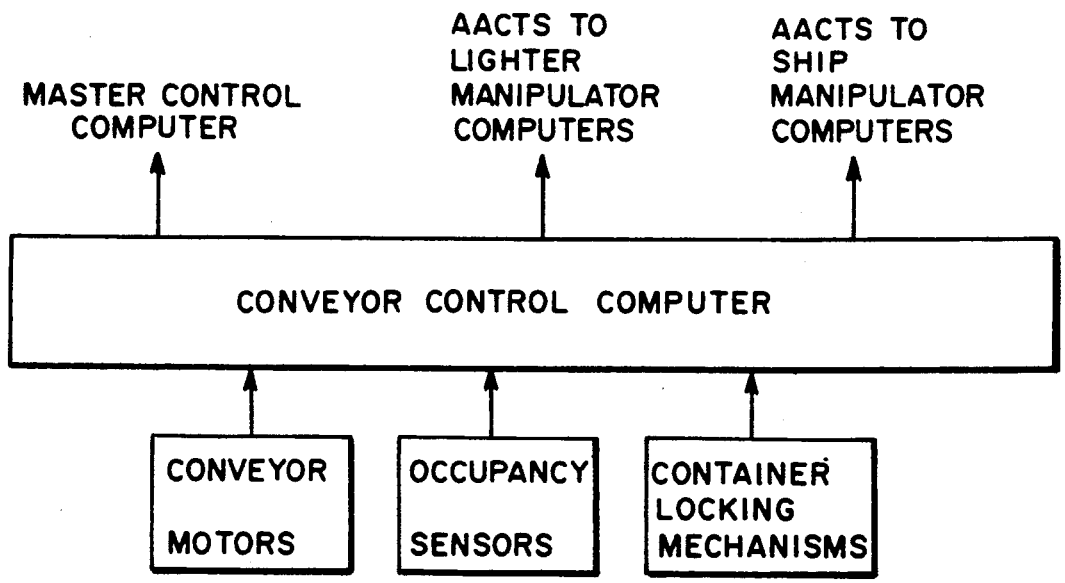
FIG. 32 is a block diagram of the conveyor control computer.

The Master Control Computer coordinates the activities of the Conveyor Control Computer, shown in block diagram in FIG. 32. The Conveyor Control Computer is a relatively simple computer that monitors the container conveyors, sets direction and movement based primarily on commands received from the Master Control Computer. The Master Control Computer sends the Conveyor Control Computer motion, and direction commands. The Conveyor Control Computer sends status and occupancy information back to the Master Control Computer.

The Conveyor Control Computer controls the speed and direction of the Conveyor Motors. The Conveyor Control Computer monitors the Conveyor Occupancy Sensors so it can report the real time status of each container on the conveyor system. The Conveyor Control Computer also controls the Container Locking Mechanisms which will lock the containers on the conveyor belt and release them as they are engaged by the manipulator arms. The locking mechanism is expected to utilize the standard ISO corner fittings in the container corner posts.

The Master Control Computer is also responsible for monitoring safety systems such as interlocks and sensors. The Master Control Computer coordinates the activities of the manipulators and the conveyor to insure that systems operate smoothly and safely. In addition to the safety related functions of the Master Control Computer, an independent Safety Computer will be included as a back up. It is desirable, though not essential to the inventive concept, that the AACTS system be designed with redundant control systems and sensors to minimize the chance for any failure and that the system be fail safe.

A Manual Override System is incorporated so that the computers can be bypassed and the system operated "manually".

The top level functions of the Master Control Computer (discussed below) are to gather Initial Data, insure Safety, perform the Stabilization Function, perform the Cargo Handling Function and to Perform Berthing and Warping of Lighters.

The Master Control Computer will obtain information through the Operator Interface regarding operations underway. For the most efficient operation, the Master Control Computer should, for example, know the number and type of lighters available for the operation so it can queue compatible containers on the conveyor. In addition, the Master Control Computer should know such items as the type of containers to be carried, number that can be carried by the lighter, maximum weight that can be carried, container placement configurations, method of berthing to be used, method of warping to be employed, weight distribution restrictions, tentative lighter schedule, and current lighter queue, if any.

Similarly, the Master Control Computer should also obtain ship information such as the ship manifest. Details of the ship's manifest may include such items as the exact location of each container (hatch, cell, tier, deck), physical details of each container (size, weight), type of container (dry, refrigerated, etc.), serial number, contents (e.g., dangerous, fluid, fragile, etc.), priority (if any). The Master Control Computer should also be provided with information regarding stacking frames, hatch covers, and stacking method.

The Master Control Computer must be provided with information regarding the ship configuration such as the number of hatches, the hatch configuration, the position of hatches. The Master Control Computer also needs physical information regarding berthing, physical information regarding superstructure or other potential obstacles.

Most of the above information will reside in a standard data base. However, there will be times when the information is not available. In these cases, the computer will request that the operator input the information. The computer will guide the operator through the data input operation. Such new information will be placed in the data base, and will be subject to verification.

A major function of the Master Control Computer will be to continuously monitor the status of all the computers. If an unsafe condition occurs (including environmental conditions), the Master Control Computer must take action. For example, it may alert the operator, provide the operator with instruction, halt operations and/or invoke manual controls.

As part of the safety function, the Master Control Computer will display status information on the operator interface. This information will include data regarding every container under AACTS control, all subsystems, and all critical parameters, sensors, and interlocks.

In addition to performing its own safety functions, the Master Control Computer will interrupt normal operation if the Safety Computer senses a problem. In this case the Master Control Computer will take action (where permitted), alert the operator, and invoke manual controls (if applicable).

An important concept in AACTS is the requirement for a relatively stable platform from which the manipulator arms may work. The Master Control Computer must insure that the platform is stable.

In operation, the Master Control Computer will obtain a detailed forecast of the wave motion within the AACTS domain for the next instant of time from the Wave Prediction Computer. From data provided by the Leveling Computers, the Master Control Computer must determine the current position of the frame relative to the Delong barges and to the horizontal plane. From the above, the Master Control Computer must determine the desired position of the frame and the support tripods. It then sends the desired position commands to the Level Computers.

The Master Control Computer must also obtain data from the Berthing Control Computers to obtain the attitude of each lighter. Based on the current attitude and wave prediction, the Master Control Computer must determine the desired attitude of each lighter and send appropriate commands to the Berthing Control Computers.

Based on the status reported by the Mooring Computers and the prediction of wave activity, the Master Control Computer must determine what action, if any, should be taken by the various mooring winches. Any desired action must be formed into commands and sent to the Mooring Computers.

The Master Control Computer must control the movement of containers through the AACTS's hardware. This involves controlling the ship, lighters, manipulators, and the conveyor system.

When a ship manipulator arm is idle, the Master Control Computer must determine an assignment based on availability of an inbound container on the ship within the range of the manipulator, availability of an outbound container on the conveyor within the reach of the manipulator, status of the lighter manipulators (e.g., in this case, if the lighter manipulators are not available the ship manipulators can work the lighter directly), specific priorities of the off-loading or stowage plans (e.g., the container must match with the lighter, or with the current spreader configuration), status of the availability of space on Delong barges (in the event containers are to be buffered on the barges), safety of the operation (e.g., the Master Control Computer loading/unloading method should minimize the height between stacks), and efficiency of the operation.

Once an assignment for a ship manipulator is determined, the Master Control Computer must develop the specific commands for the Ship Manipulator Computer. The commands will bring the manipulator within close but safe distance of the target container. (Once within proximity, the fine sensors of the Ship Manipulator Computer will zero in on the target). The commands are based on wave prediction information and current position of the manipulators with respect to the transverse frame and the ship.

Similarly, when a lighterage manipulator arm is idle, the Master Control Computer must determine an assignment based on availability of an inbound container on the lighter within the range of the manipulator, availability of an inbound container on the conveyor within the reach of the manipulator, specific priorities of the off-loading or stowage plans, type of containers available (e.g., the container must match with berthed or queued lighters and may need to match with current spreader configuration), safety of the operation, and efficiency of the operation.

Once an assignment for a lighterage manipulator is determined, the Master Control Computer must develop the specific commands for the Lighter Manipulator Computer. As with the ship manipulators, the commands will bring the lighter manipulator within close but safe distance of the target container. (Once in close proximity the fine sensors of the Lighter Manipulator computer will zero in on the target). The commands are based on wave prediction information and current position of the manipulator with respect to the transverse frame and the lighter.

The Master Control Computer must also determine the direction and motion assignments for the conveyors based on current status of conveyor and cargo flow status.

The Master Control Computer will supervise the berthing and warping of lighters. The Master Control Computer must first obtain information regarding the pending arrival of lighters via the Operator Interface. The Master Control Computer must then determine the method of berthing the particular lighter and send commands to the Berthing Control Computer.

Based on cargo movement actions, and the configuration of the particular lighter, the Master Control Computer must develop the necessary warping commands and send the commands to the Berthing Control Computer. This includes releasing the lighter when the assignment is completed.

An AACTS has two types of manpower requirements: installation and throughput operation. Installation includes debarkation in the objective area, assembly of the transverse frame and barges into the appropriate configuration, installation of the mooring subsystem and deployment of the berthing modules. Throughput support includes all operational manning requirements for the AACTS in its container transfer role.

Installation of an AACTS essentially means that the port construction unit would deploy and install the anchoring and mooring subsystem, assemble that element of the transverse frame which had been stowed under the SEABEE's superstructure, connect and erect all components of the transverse frame, and hook-up all power and energy sources. Approximately 50 personnel may be required.

The port construction unit is assisted by two 65-ft tugs, embarked as part of the AACTS package. During AACTS off-loading, system assembly, and installation, the tugs also will be required to assist in the installation of embedded anchors and attachment of buoys, tending barges and positioning them for assembly of the transverse frame. The tugs would tend the AACTS during throughput operations and, consistent with existing operations, assist ships in mooring and clearing the transfer site once their off-loading or loading is completed.

One transportation terminal service (container) company would operate a single AACTS around-the-clock. The terminal service company includes personnel and equipment for support of limited automated cargo accounting. The company would have its own manifests and cargo accountability requirements outside of the LOTS area. Potentially, a harbormaster detachment could assist in operations at the AACTS for control and dispatch of lighters in the vicinity.

Preliminary manning estimates indicate that a total requirement of 22 soldiers plus a maintenance team (to include generator operators) will be required for each shift on an AACTS. This number would include two personnel as part of a harbormaster detachment and a possible computer/communications specialist from outside the container company to assist in lighterage control and automated handling of ship cargo manifests, customs requirements and such other special documentation needs.

Basically, each shift has one team organized for each ship to be discharged/loaded. Each container handling manipulator (four servicing each side of the AACTS) and conveyor/buffer equipment (two per side) will be supervised by one soldier. In addition, two cargo handlers will be assigned to each ship as backup for others responsible for the automated equipment (i.e., manipulators). Thus, if required, each piece of equipment could be manually operated until the automated systems were repaired. Each ship team would be supervised by a team leader.

Overall control of the teams and AACTS is accomplished by a section chief or shift supervisor. The section chief will be supported by the harbormaster, communications, and computer personnel. A maintenance team expected to be about four people will also be under the section chief's supervision. Maintenance personnel would be responsible for the power units, computers, automated handling equipment, and actuators.

Figure 5B:
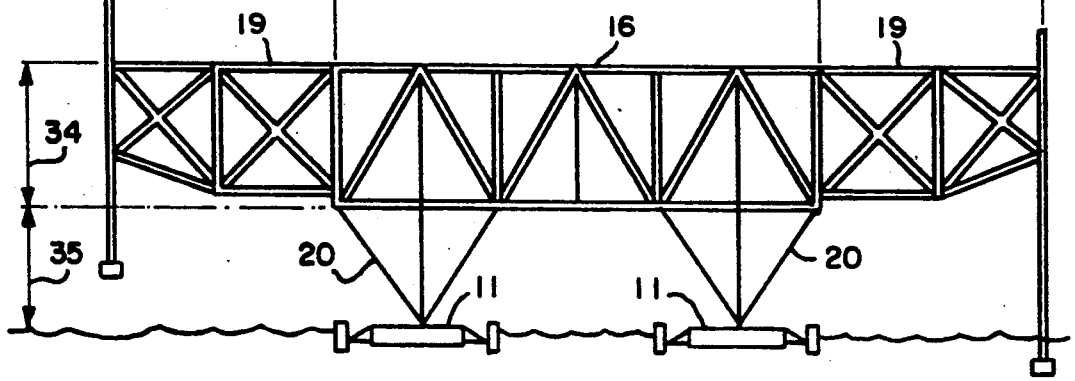
FIG. 5B is a simplified front view of the AACTS.
Figure 33:
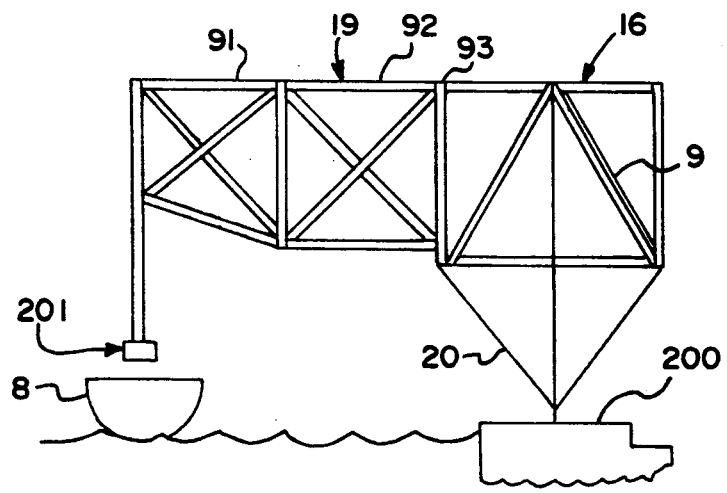
FIG. 33 is a simplified elevation view, partially fragmented, of a pier-based embodiment of the AACTS.

Another application of AACTS capability may be use of the concepts in an automated pierside discharge system for harbors or ports where existing facilities may be over-burdened or destroyed. However, there must be sufficient pier space for container handling and water deep enough to berth the vessel. In this mode the AACTS would be reconfigured to permit direct offloading of containers from the ship onto tractor-trailers driving through on the pier. FIG. 33 is a simplified showing of such a pier-based system. The transverse frame or platform generally designated 16, and comprising structural members or elements 9, is mounted by means of actuators 20 on pier 200. A manipulator subsystem 19, comprising a shoulder 93, an upper arm 92, and a forearm 91 extends from the frame 16. The spreader bar and its associated structure 201 is generally shown in a simplified form, suspended over a vessel 8. Common elements are generally as shown in FIGS. 5B and 20B.

An automated system for commercial application is of interest to the shipping industry. While companies prefer to operate using containers, many areas of the world do not have ports that can handle containerized cargo. A system such as AACTS may open new areas of the world to U.S. shipping companies and increase the productivity in other areas.

AACTS components may also be of significant value to shipping companies. Presently, container ports are operated using large cranes manned by highly skilled marine crane personnel. AACTS manipulators may greatly increase productivity when applied to standard port operations.

I claim:

1. An automated vessel cargo transfer system comprising elements, said elements comprising: a plurality of support barges, said barges being in parallel and laterally displaced position, a transverse frame extending between said barges, an interface between each of said barges and said transverse frame, at least one manipulator arm extending from and mounted on said transverse frame, a spreader bar on said manipulator arm, said spreader bar having six adjustable degrees of freedom of motion, sensing means to determine the relative positions of a vessel and elements of said cargo transfer system, computer means operatively connected to said sensing means and to said transverse frame of said vessel cargo transfer system, said interface comprising at least one actuator system, each said actuator system comprising three electro-hydraulic/pneumatic actuators forming an inverted tripod, the length of each actuator being adjustable in response to signals from said computer means, whereby the motion of said vessel is adjusted for by appropriate following motion of said transverse frame.

2. An automated vessel cargo transfer system as set forth in claim 1 wherein there are four support barges, arranged in pairs, each said pair comprising two barges arranged end to end in serial relationship, and each said pair being arranged in parallel and laterally displaced position.

3. An automated vessel cargo transfer system as set forth in claim 1 wherein said interface between each of said barges and said transverse frame includes an actuator.

4. An automated vessel cargo transfer system comprising elements, said elements comprising: a plurality of support barges, said barges being in parallel and laterally displaced position, a transverse frame extending between said barges, an interface between each of said barges and said transverse frame, at least one manipulator arm extending from and mounted on said transverse frame, a spreader bar on said manipulator arm, said spreader bar having six adjustable degrees of freedom of motion, sensing means to determine the relative positions of a vessel and elements of said cargo transfer system, computer means operatively connected to said sensing means and to said transverse frame of said vessel cargo transfer system, at least one berthing module on at least one of said barges, said berthing module being capable of six degrees of freedom, at least five of said degrees being controllably adjustable, whereby the motion of said vessel is adjusted for by appropriate following motion of said transverse frame.

5. An automated vessel cargo transfer system as set forth in claim 4 wherein each of said barges is provided with at least one berthing module.

6. An automated vessel cargo transfer system as set forth in claim 5 wherein at least one of said barges includes at least one berthing module on each lateral side thereof.

7. An automated vessel cargo transfer system as set forth in claim 6 wherein at least one said berthing module has six controllable adjustable degrees of freedom.

8. An automated vessel cargo transfer system as set forth in claim 7 wherein there are a plurality of manipulator arms extending from and mounted on said transverse frame, and a spreader bar on each said manipulator arm.

9. An automated vessel cargo transfer system as set forth in claim 8 wherein said sensing means operates with rapidly repeating determinations so as to be effectively continuous in determining the relative positions of said vessel and said transverse frame, and said appropriate following motion of said transverse frame is effectively continuously adjusted.

10. A shore-based automated vessel cargo transfer system comprising elements, said elements comprising: a pier, a frame extending from said pier, an interface between said frame and said pier, at least one manipulator arm extending from and mounted on said frame, a spreader bar on said manipulator arm, said spreader bar having six adjustable degrees of freedom of motion, sensing means to determine the relative positions of a vessel and elements of said cargo transfer system, computer means operatively connected to said sensing means and to said frame of said vessel cargo transfer system, said interface comprising at least one actuator system, each said actuator system comprising three electro-hydraulic/pneumatic actuators forming an inverted tripod, the length of each actuator being adjustable in response to signals from said computer means, whereby the motion of said vessel is adjusted for by appropriate following motion of said frame.

11. A shore-based automated vessel cargo transfer system as set forth in claim 10 wherein there is at least one berthing module on said pier, said berthing module being capable of six degrees of freedom, at least five of said degrees being controllably adjustable.

12. A shore-based automated vessel cargo transfer system as set forth in claim 11 wherein said sensing means operates with rapidly repeating determinations so as to be effectively continuous in determining the relative positions of said vessel and said frame, and said appropriate following motion of elements of said system is effectively continuously adjusted.

* * * * *